United States Patent
Hanasaki et al.

(10) Patent No.: US 12,077,623 B2
(45) Date of Patent: Sep. 3, 2024

(54) CURABLE COMPOSITION FOR OPTICAL MATERIALS, AND OPTICAL MATERIAL

(71) Applicant: TOKUYAMA CORPORATION, Shunan (JP)

(72) Inventors: Taichi Hanasaki, Tsukuba (JP); Ayako Ohara, Tsukuba (JP); Junji Takenaka, Tsukuba (JP); Junji Momoda, Tsukuba (JP)

(73) Assignee: TOKUYAMA CORPORATION, Shunan (JP)

( * ) Notice: Subject to any disclaimer, the term of this patent is extended or adjusted under 35 U.S.C. 154(b) by 600 days.

(21) Appl. No.: 17/413,667

(22) PCT Filed: Dec. 17, 2019

(86) PCT No.: PCT/JP2019/049276
§ 371 (c)(1),
(2) Date: Jun. 14, 2021

(87) PCT Pub. No.: WO2020/129930
PCT Pub. Date: Jun. 25, 2020

(65) Prior Publication Data
US 2022/0056187 A1 Feb. 24, 2022

(30) Foreign Application Priority Data

Dec. 17, 2018 (JP) .................. 2018-235551
Dec. 18, 2018 (JP) .................. 2018-236343
Dec. 18, 2018 (JP) .................. 2018-236344

(51) Int. Cl.
| | |
|---|---|
| *C08F 2/46* | (2006.01) |
| *C08F 2/50* | (2006.01) |
| *C08F 20/14* | (2006.01) |
| *C08F 222/10* | (2006.01) |
| *C08F 290/14* | (2006.01) |
| *C08G 61/04* | (2006.01) |
| *C08K 5/3475* | (2006.01) |
| *C08L 75/06* | (2006.01) |
| *G02B 1/111* | (2015.01) |
| *G02B 1/04* | (2006.01) |

(52) U.S. Cl.
CPC .......... *C08F 222/1063* (2020.02); *C08F 2/50* (2013.01); *C08F 20/14* (2013.01); *C08F 290/142* (2013.01); *C08K 5/3475* (2013.01); *C08L 75/06* (2013.01); *G02B 1/111* (2013.01); *C08F 2800/20* (2013.01); *G02B 1/041* (2013.01)

(58) Field of Classification Search
CPC ...... C08L 75/00; C08L 2666/70; C08L 33/10; C09D 4/00; G02B 1/111; G02B 1/041; G02C 7/108; C08F 222/1063; C08F 222/1025; C08F 222/103; C08F 222/102; C08F 2/48; C08F 2/50; C08F 2/44; C08F 290/142; C08F 20/14; C08F 2800/20; C08F 220/325; C08K 5/3475
USPC .......... 522/9, 8, 7, 6, 71, 1, 189, 184; 520/1
See application file for complete search history.

(56) References Cited

U.S. PATENT DOCUMENTS

| | | | |
|---|---|---|---|
| 3,493,539 A * | 2/1970 | Fertig .................. | C07D 249/20 524/548 |
| 6,365,223 B1 | 4/2002 | Yoshimura et al. | |
| 10,066,081 B2 | 9/2018 | Kakinuma et al. | |
| 10,745,539 B2 | 8/2020 | Kousaka et al. | |
| 10,752,726 B2 | 8/2020 | Kageyama et al. | |
| 2002/0028918 A1* | 3/2002 | Kasada .................. | C09B 69/045 534/693 |
| 2005/0113478 A1 | 5/2005 | Suzuki | |
| 2007/0127133 A1 | 6/2007 | Momoda et al. | |
| 2010/0238540 A1 | 9/2010 | Miyakawa | |

(Continued)

FOREIGN PATENT DOCUMENTS

| | | |
|---|---|---|
| CN | 108026277 A | 5/2018 |
| CN | 108473643 A | 8/2018 |

(Continued)

OTHER PUBLICATIONS

Ishihara, JP 2018197833 Machine Translation, Dec. 13, 2018 (Year: 2018).*

(Continued)

*Primary Examiner* — Jessica Whiteley
(74) *Attorney, Agent, or Firm* — Birch, Stewart, Kolasch & Birch, LLP

(57) ABSTRACT

The present invention relates to a curable composition for an optical material, containing (A) 100 parts by mass of a radical polymerizable monomer, (B) 0.1 to 5 parts by mass of an ultraviolet absorber composed of a benzotriazole compound having a specific structure, which has a maximum absorption wavelength of 360 nm or more and less than 380 nm and an absolute value of the difference in solubility parameter (SP value) from the radical polymerizable monomer (A) of 5.5 $(cal/cm^3)^{1/2}$ or less, (C) 1 to 5 parts by mass of an ultraviolet absorber which is at least one selected from a benzotriazole compound, a benzophenone compound and a triazine compound and has a maximum absorption wavelength of less than 360 nm, and (D) 0.05 to 0.5 parts by mass of a radical polymerization initiator. According to the present invention, it is possible to provide a curable composition for an optical material which has an ability to cut ultraviolet rays and blue light and can be suitably used as a coating material having good storage stability and weather resistance.

12 Claims, No Drawings

(56) References Cited

U.S. PATENT DOCUMENTS

| | | |
|---|---|---|
| 2015/0370094 A1 | 12/2015 | Hashimoto et al. |
| 2016/0223839 A1 | 8/2016 | Kakinuma et al. |
| 2017/0153464 A1 | 6/2017 | Tamura et al. |
| 2018/0016415 A1 | 1/2018 | Kakinuma et al. |
| 2018/0273673 A1 | 9/2018 | Kageyama et al. |
| 2018/0340044 A1 | 11/2018 | Kakinuma et al. |
| 2020/0270421 A1 | 8/2020 | Namiki et al. |

FOREIGN PATENT DOCUMENTS

| | | | |
|---|---|---|---|
| EP | 3 640 686 A1 | | 4/2020 |
| JP | 1-230003 A | | 9/1989 |
| JP | H06-128503 A | | 5/1994 |
| JP | 9-265059 A | | 10/1997 |
| JP | 2001-235601 A | | 8/2001 |
| JP | 3223460 B2 | | 10/2001 |
| JP | 2005-338868 A | | 12/2005 |
| JP | 2008-134618 A | | 6/2008 |
| JP | 2011-145341 A | | 7/2011 |
| JP | 4813900 B2 | | 11/2011 |
| JP | 2012-41333 A | | 3/2012 |
| JP | 2012-173704 A | | 9/2012 |
| JP | 2012-219169 A | | 11/2012 |
| JP | 2016-125049 A | | 7/2016 |
| JP | 2016-157146 A | | 9/2016 |
| JP | 2016-166138 A1 | | 9/2016 |
| JP | 2017-19903 A | | 1/2017 |
| JP | 2017-31230 A | | 2/2017 |
| JP | 2018-16778 A | | 2/2018 |
| JP | 2018-087262 A | | 6/2018 |
| JP | 2018-97173 A | | 6/2018 |
| JP | 2018197833 | * | 12/2018 |
| JP | 2018197833 A | * | 12/2018 |
| JP | 7151726 B2 | | 10/2022 |
| TW | 201437670 A | | 10/2014 |
| WO | WO 2005/075193 A1 | | 8/2005 |
| WO | WO 2009/038134 A1 | | 3/2009 |
| WO | WO 2014/133111 A1 | | 9/2014 |
| WO | WO 2014/155787 A1 | | 10/2014 |
| WO | WO 2015/037628 A1 | | 3/2015 |
| WO | WO 2015/088015 A1 | | 6/2015 |
| WO | 2016/125736 A1 | | 8/2016 |
| WO | WO 2017/182639 A1 | | 10/2017 |

OTHER PUBLICATIONS

Chinese Notice of Allowance and Search Report for Chinese Application No. 201980082160.6, dated Mar. 16, 2022.
Chinese Office Action and Search Report for Chinese Application No. 201980082234.6, dated Aug. 23, 2022.
Japanese Notice of Allowance for corresponding Japanese Application No. 2020-561431, dated Jan. 17, 2023.
Extended European Search Report for European Application No. 19898115.1, dated Sep. 16, 2022.
Extended European Search Report for European Application No. 19899636.5, dated Sep. 16, 2022.
Japanese Office Action for corresponding Japanese Application No. 2020-561430, dated Jul. 4, 2023.
U.S. Office Action for U.S. Appl. No. 17/413,754, dated Sep. 21, 2023.
International Search Report, issued in PCT/JP2019/049276, dated Mar. 24, 2020.
International Search Report, issued in PCT/JP2019/049277, dated Mar. 10, 2020.
International Search Report, issued in PCT/JP2019/049279, dated Mar. 10, 2020.
Written Opinion of the International Searching Authority, issued in PCT/JP2019/049276, dated Mar. 24, 2020.
Written Opinion of the International Searching Authority, issued in PCT/JP2019/049277, dated Mar. 10, 2020.
Written Opinon of the International Searching Authority, issued in PCT/JP2019/049279, dated Mar. 10, 2020.
Chinese Office Action for Chinese Application No. 20190082137.7, dated Oct. 10, 2022.
Chinese Office Action and Search Report for Chinese Application No. 201980082234.6, dated Mar. 16, 2022.
U.S. Notice of Allowance for U.S. Appl. No. 17/413,754, dated Jan. 24, 2024.
U.S. Office Action for U.S. Appl. No. 17/413,841, dated Jan. 17, 2024.
U.S. Notice of Allowance for U.S. Appl. No. 17/413,841, dated May 2, 2024.

* cited by examiner

CURABLE COMPOSITION FOR OPTICAL MATERIALS, AND OPTICAL MATERIAL

TECHNICAL FIELD

The present invention relates to a curable composition for an optical material containing an ultraviolet absorber having good long-term storage stability, and a cured body obtained by curing the curable composition for an optical material. More specifically, the present invention relates to a curable composition for an optical material, which can be suitably used as a coating material capable of easily providing an optical material having a high blue light cut rate and a low yellow coloration degree by being laminated with an optical substrate such as a spectacle lens.

BACKGROUND ART

The adverse effects of exposure of the eye to ultraviolet radiation have long been considered as a problem. Furthermore, in recent years, it has been said that light rays in the blue region (380 to 500 nm) (hereinafter also referred to as blue light) have strong energy with respect to the health of the eyes, and therefore cause damage to the retinas and the like. The damage caused by blue light is called "blue light hazard", and to prevent it, it is said to be desirable to cut blue light, especially the relatively short wavelengths of about 380 to 420 nm.

At present, as spectacle lenses, plastic lenses using optical substrates made of plastic are mainly used because of their good processability and durability. As a method of cutting the blue light in the plastic lens, a method of blending an ultraviolet absorber capable of cutting the blue light in an optical material made of the plastic lens has been studied.

As a method of blending the ultraviolet absorber, (a) a method in which a plastic lens substrate is immersed in a solution in which an ultraviolet absorber is dispersed (hereinafter sometimes simply referred to as "immersion method") (see PTLs 1 and 2), (b) a method in which an ultraviolet absorber is dispersed in a plastic lens monomer forming a plastic lens substrate and polymerized and molded (hereinafter sometimes simply referred to as "lens substrate dispersion method") (see PTLs 3 to 6), (c) a method in which an ultraviolet absorber is dispersed in a hard coat layer formed on the surface of a plastic lens substrate (hereinafter sometimes simply referred to as "hard coat layer dispersion method") (see PTLs 7 and 8), and the like are known.

However, there is room for improvement in the conventional methods described above in the following points. First, in the immersion method (a), it is necessary to control the amount of the ultraviolet absorber impregnated into the plastic lens substrate to be constant, but there is room for improvement in that the plastic lens substrate is limited to a plastic lens substrate capable of performing this control. That is, in the immersion method, there is a plastic lens substrate in which the amount of the ultraviolet absorber cannot be controlled to be constant, and there is room for improvement in that it is not general-purpose.

Further, in the lens substrate dispersion method (b), there is room for improvement in that the method cannot cope with a difference in thickness of the plastic lens substrate. The ultraviolet absorption characteristics vary depending on the thickness of the substrate, for example, a plastic lens substrate. When the substrate is a lens for correcting myopia, there is a difference between the thickness (thin) of the central portion of the lens and the thickness (thick) of the end portion of the lens. Therefore, there is room for improvement in that the ultraviolet absorption characteristics are different between the central portion and the end portion of the lens, the ultraviolet absorber needs to be used in a large excess when the ultraviolet absorption characteristics are adjusted to the central portion of the lens, and the amount of the ultraviolet absorber is small when the ultraviolet absorption characteristics are adjusted to the end portion of the lens, so that the ultraviolet absorption characteristics of the central portion of the lens are not sufficient. In addition, in the case of using an ultraviolet absorber having absorption at a long wavelength, coloring is likely to occur, but in a lens in which the thickness differs between the central portion and the end portion, there is room for improvement in that it is difficult to maintain high transparency of the entire lens surface when the ultraviolet absorber is blended.

In contrast to the above methods, in the hard coat layer dispersion method (c), since the hard coat layer formed on the substrate usually has a uniform film thickness, the problem as in the lens substrate dispersion method described above does not occur. In addition, since the hard coat layer is formed on the plastic lens substrate, it can be applied to a wide range of materials (substrates) regardless of the type of the plastic lens substrate as in the immersion method described above.

However, according to the studies of the present inventors, it has been found that the hard coat layer dispersion method also has room for improvement in the following points. The hard coat composition for forming the hard coat layer described in PTLs 7 and 8 contains inorganic particles such as silica particles and a compound that forms a high molecular weight product by a condensation reaction, such as a hydrolyzable group-containing organosilicon compound (for example, alkoxysilane). According to the studies of the present inventors, it has been found that, in order to sufficiently block ultraviolet rays and blue light having relatively long wavelengths of 400 nm or more with these hard coat compositions, the amount of the ultraviolet absorber added must be increased as compared with the usual amount, or the thickness of the hard coat layer to be formed must be thicker. As a result, in the hard coat layer dispersion method, it is difficult to achieve the object of improving the original scratch resistance of the hard coat layer while maintaining high ultraviolet absorption performance, and there is room for improvement.

On the other hand, in recent years, with the spread of smartphones and the like, there is an increasing demand for optical materials that cut blue light, and there is a demand for materials for optical materials that can easily impart such performance, and optical materials using the same. In order to provide an optical material that easily cuts ultraviolet rays and blue light with respect to optical substrates made of various materials, it is considered optimal to laminate a layer having such performance with the optical substrate. However, in order to form a thin film that sufficiently cuts light having wavelengths from 380 nm to 420 nm, in the above-described methods in which an ultraviolet absorber is blended, the amount of the ultraviolet absorber to be blended is further increased, and from the viewpoint of solubility in resin, there has been a problem that deterioration of storage stability due to precipitation of the ultraviolet absorber and deterioration of weather resistance due to bleeding-out occur.

CITATION LIST

Patent Literature

[PTL 1] JP 01-230003 A
[PTL 2] JP 2005-338868 A

[PTL 3] WO2014133111 A
[PTL 4] JP 2016-157146 A
[PTL 5] WO2015088015 A
[PTL 6] WO2016125736 A
[PTL 7] JP 9-265059 A
[PTL 8] WO2005075193 A

SUMMARY OF INVENTION

Technical Problem

Accordingly, an object of the present invention is to provide a material for providing an optical material excellent in the ability to cut ultraviolet rays and blue light in an optical substrate such as a plastic lens. More specifically, it is an object of the present invention to provide a curable composition for an optical material that can be applied to substrates of various materials regardless of the difference in materials, has the ability to cut ultraviolet rays and blue light, and can be suitably used as a coating material having good storage stability and weather resistance.

Solution to Problem

As a result of diligent studies to achieve the above object, the present inventors have found that a curable composition for an optical material, which has the ability to cut ultraviolet rays and blue light, has low yellow coloration, and can be suitably used as a coating material having good storage stability and weather resistance, can be obtained by combining an ultraviolet absorber having a maximum absorption wavelength of 360 nm or more and less than 380 nm, composed of a benzotriazole compound which has a specific structure having an electron-donating substituent on the phenol ring of benzotriazole, and an organic group compatible with a radical polymerizable monomer in the structure, and an ultraviolet absorber having a maximum absorption wavelength of less than 360 nm, and the present invention has been completed.

That is, the present invention is as follows.

[1] A curable composition for an optical material, containing:
  (A) 100 parts by mass of a radical polymerizable monomer;
  (B) 0.1 to 5 parts by mass of a benzotriazole-based ultraviolet absorber represented by the following formula (1), which has a maximum absorption wavelength of 360 nm or more and less than 380 nm and an absolute value of the difference in solubility parameter (SP value) from the radical polymerizable monomer (A) of 5.5 $(cal/cm^3)^{1/2}$ or less;
  (C) 1 to 5 parts by mass of an ultraviolet absorber which is at least one selected from a benzotriazole compound, a benzophenone compound and a triazine compound and has a maximum absorption wavelength of less than 360 nm; and
  (D) 0.05 to 0.5 parts by mass of a radical polymerization initiator:

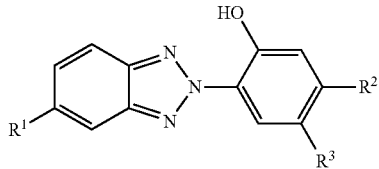

(1)

wherein $R^1$ represents a hydrogen atom, an alkyl group having 1 to 8 carbon atoms, an alkoxy group having 1 to 8 carbon atoms, a hydroxy group, a linear or branched monosubstituted amino group having 1 to 4 carbon atoms, a linear or branched disubstituted amino group having 1 to 4 carbon atoms, a nitro group, a carboxy group, an alkyloxycarbonyl group having 1 to 8 carbon atoms in the alkyl group, a hydroxyalkyl group having 1 to 8 carbon atoms, an alkylcarbonyloxyalkyl group having 1 to 8 carbon atoms in each alkyl group, a carboxyalkyl group having 1 to 3 carbon atoms in the alkyl group, an alkyloxycarbonylalkyl group in which the total number of carbon atoms in the alkyl group is 2 to 10, an aryl group, an acyl group, a sulfo group, or a cyano group; $R^2$ represents a hydroxy group, an alkoxy group having 1 to 8 carbon atoms, an alkylthio group having 1 to 8 carbon atoms, a linear or branched monosubstituted amino group having 1 to 4 carbon atoms, or a linear or branched disubstituted amino group having 1 to 4 carbon atoms; and $R^3$ represents a hydrogen atom, a hydroxy group, an alkyl or alkoxy group having 1 to 8 carbon atoms, a linear or branched monosubstituted amino group having 1 to 4 carbon atoms, or a linear or branched disubstituted amino group having 1 to 4 carbon atoms, and may be a cyclic structure in which $R^2$ and $R^3$ are crosslinked.

The present invention can take the following modes.
[2] The curable composition for an optical material as set forth in [1], wherein the radical polymerizable monomer (A) is a (meth)acrylic polymerizable compound.
[3] The curable composition for an optical material as set forth in [1] or [2], wherein the radical polymerization initiator (D) is a photopolymerization initiator.
[4] The curable composition for an optical material as set forth in [3], wherein the ratio of the sum of the masses of the ultraviolet absorbers (B) and (C) to the mass of the photopolymerization initiator is 6:1 or more and 30:1 or less.
[5] The curable composition for an optical material as set forth in any one of [1] to [4], further containing (E) a light-absorbing compound having a maximum absorption wavelength in a range of 400 nm or more and 450 nm or less.
[6] The curable composition for an optical material as set forth in any one of [1] to [5], wherein the light-absorbing compound (E) is a porphyrin compound.
[7] The curable composition for an optical material as set forth in any one of [1] to [6], further containing (F) a dye having a maximum absorption wavelength in a range of 540 nm or more and 650 nm or less.
[8] A cured body obtained by curing the curable composition for an optical material as set forth in [1] to [7].
[9] An optical material obtained by laminating an optical substrate and the cured body as set forth in [8].
[10] The optical material as set forth in [9], wherein the cured body has a thickness of 5 to 70 μm.
[11] The optical material as set forth in [9] or [10], wherein the optical material has a light transmittance of 5% or less at a wavelength of 400 nm and a light transmittance of 70% or less at a wavelength of 420 nm.

In the present invention, the maximum absorption wavelength and the like of each compound were measured in a solvent that does not affect the measurement. Examples of the solvent include chloroform.

Advantageous Effects of Invention

By using the curable composition for an optical material of the present invention, ultraviolet ray cutting ability and blue light cutting ability can be effectively and easily imparted to an optical substrate such as a plastic lens substrate. In addition, in the curable composition for an optical material, the precipitation of the ultraviolet absorber is not observed and the storage stability is good, and in the cured body, the bleeding-out of the ultraviolet absorber is not observed and the weather resistance is also good, so that the utility value is high.

Further, the curable composition for an optical material of the present invention is suitably used for an optical material application in which a cured body obtained from the curable composition for an optical material and an optical substrate such as a plastic lens substrate are laminated, and the cured body obtained alone exhibits the excellent effects described above.

DESCRIPTION OF EMBODIMENTS

The curable composition for an optical material according to the present invention is a curable composition for an optical material, containing (A) 100 parts by mass of a radical polymerizable monomer, (B) 0.1 to 5 parts by mass of a benzotriazole-based ultraviolet absorber having a maximum absorption wavelength of 360 nm or more and less than 380 nm and an absolute value of the difference in solubility parameter (SP value) from the radical polymerizable monomer (A) of 5.5 $(cal/cm^3)^{1/2}$ or less, (C) 1 to 5 parts by mass of at least one ultraviolet absorber selected from a benzotriazole compound, a benzophenone compound and a triazine compound and having a maximum absorption wavelength of less than 360 nm, and (D) 0.05 to 0.5 parts by mass of a radical polymerization initiator.

Hereinafter, each component will be described.
<Component (A): Radical Polymerizable Monomer>

As the radical polymerizable monomer, a radical polymerizable compound having a carbon-carbon unsaturated bond can be used without particular limitation, and among them, a (meth)acrylic polymerizable compound which is a polymerizable compound having a (meth)acrylate group can be preferably used. Among them, a polyfunctional (meth) acrylic polymerizable compound having two or more (meth) acrylate groups in the molecule can be preferably used, and it is more preferable to use a bifunctional (meth)acrylic polymerizable compound having two (meth)acrylate groups in the molecule (hereinafter may be simply referred to as "(A1) bifunctional (meth)acrylic polymerizable compound" or "component (A1)") and a polyfunctional (meth)acrylic polymerizable compound having three or more (meth)acrylate groups in the molecule (hereinafter may be simply referred to as "(A2) polyfunctional (meth)acrylic polymerizable compound" or "component (A2)").

In addition, a monofunctional (meth)acrylic polymerizable compound having one (meth)acrylate group (hereinafter may be simply referred to as "(A3) monofunctional (meth)acrylic polymerizable compound" or "component (A3)") or a radical polymerizable monomer having a carbon-carbon unsaturated bond and having no (meth)acrylate group (hereinafter may be simply referred to as "(A4) vinyl polymerizable compound" or "component (A4)") can also be used.

Further, in the present invention, the radical polymerizable monomer is appropriately selected in consideration of a combination with an ultraviolet absorber (B) described later, but the solubility parameter (SP value) of the radical polymerizable monomer is preferably 9.0 to 11.0 $(cal/cm^3)^{1/2}$, and more preferably 9.5 to 10.0.

Here, the SP value indicates a value represented by the following Fedors' formula.

$$\text{SP value } (\delta) = (E_v/V)^{1/2} = (\Sigma\Delta e_i / \Sigma\Delta v_i)^{1/2} \quad (1)$$

$E_v$: evaporation energy
v: molar volume
$\Delta e_i$: evaporation energy of each atom or atomic group
$\Delta v_i$: molar volume of each atom or atomic group The evaporation energy and molar volume of each atom or atomic group used in the calculation of the above formula are based on "R. F. Fedors, Polym. Eng. Sci., 14, 147 (1974)".

In the present invention, when a resin obtained by polymerizing m (m is an integer of 2 or more) kinds of different polymerizable monomers is used, the SP value is calculated by the following formula.

$$\text{SP value } (\delta) = X_1\delta_1 + \ldots + X_m\delta_m$$

$X_1, \ldots X_m$ are each mol % of the monomer used, and $X_1 + \ldots + X_m = 100$ mol %.
$\delta_1, \ldots, \delta_m$ are SP values of the respective monomers and are values obtained by the above formula (1).

Hereinafter, the component (A1), the component (A2), the component (A3), and the component (A4) will be described.
<(A1) Bifunctional (Meth)Acrylic Polymerizable Compound>

As the (A1) bifunctional (meth)acrylic polymerizable compound in the present invention, compounds represented by the following formulae (2), (3) and (4) can be suitably used (hereinafter, the compound represented by the following formula (2) may be simply referred to as component (A1-1), the compound represented by the following formula (3) may be simply referred to as component (A1-2), or the compound represented by the following formula (4) may be simply referred to as component (A1-3)). In addition, a bifunctional (meth)acrylic polymerizable compound having a urethane bond (hereinafter, may be simply referred to as component (A1-4)), and a bifunctional (meth)acrylic polymerizable compound not corresponding to any of the component (A1-1), the component (A1-2), the component (A1-3), and the component (A1-4) (hereinafter, may be simply referred to as component (A1-5)) can also be used.

The component (A1) will be described in detail below.
<(A1-1) Compound Represented by the Following Formula (2)>

$$(2)$$

$$H_2C=C-\underset{R^4}{\overset{O}{\overset{\|}{C}}}-O-(CH_2\cdot CH_2\cdot O)_a\left(CH_2-\underset{}{\overset{CH_3}{\overset{|}{CH}}}-O\right)_b\underset{R^5}{\overset{O}{\overset{\|}{C}}}-C=CH_2$$

In the formula, $R^4$ and $R^5$ are each a hydrogen atom or a methyl group, a and b are each independently an integer of 0 or more, and (a+b) is 2 or more and 50 or less on average.

The polymerizable compound represented by the above formula (2) is usually obtained in the form of a mixture of molecules having different molecular weights. Therefore, a and b are shown as average values.

Specific examples of the compound represented by the above formula (2) are as follows:

Diethylene glycol dimethacrylate, triethylene glycol dimethacrylate, tetraethylene glycol dimethacrylate, pentaethylene glycol dimethacrylate, pentapropylene glycol dimethacrylate, diethylene glycol diacrylate, triethylene glycol diacrylate, tetraethylene glycol diacrylate, pentaethylene glycol diacrylate, tripropylene glycol diacrylate, tetrapropylene glycol diacrylate, pentapropylene glycol diacrylate, a dimethacrylate formed of a mixture of polypropylene glycol and polyethylene glycol (wherein polyethylene has two repeating units and polypropylene has two repeating units), polyethylene glycol dimethacrylate (particularly a=4, b=0, average molecular weight 330), polyethylene glycol dimethacrylate (particularly a=9, b=0, average molecular weight 536), polyethylene glycol dimethacrylate (particularly a=14, b=0, average molecular weight 736), tripropylene glycol dimethacrylate, tetrapropylene glycol dimethacrylate, polypropylene glycol dimethacrylate (particularly a=0, b=7, average molecular weight 536), polyethylene glycol diacrylate (particularly a=4, b=0, average molecular weight 308), polyethylene glycol diacrylate (particularly a=9, b=0, average molecular weight 508), polyethylene glycol diacrylate (particularly a=14, b=0, average molecular weight 708), and polyethylene glycol methacrylate acrylate (particularly a=9, b=0, average molecular weight 522).

<(A1-2) Compound Represented by the Following Formula (3)>

2,2-bis[4-(methacryloyloxypolyethoxy)phenyl]propane ((c+d)=30, average molecular weight 1684),
2,2-bis[4-(acryloyloxypolyethoxy)phenyl]propane ((c+d)=10, average molecular weight 776),
2,2-bis[4-(acryloyloxypolyethoxy)phenyl]propane ((c+d)=20, average molecular weight 1216).

<(A1-3) Compound Represented by the Following Formula (4)>

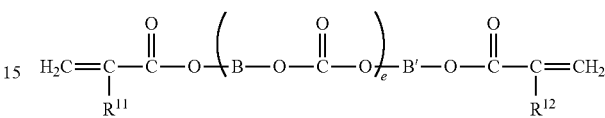

In the formula, $R^{11}$ and $R^{12}$ are each a hydrogen atom or a methyl group, e is a number of 1 to 20 on average, B and B' may be the same as or different from each other and are each a linear or branched alkylene group having 2 to 15

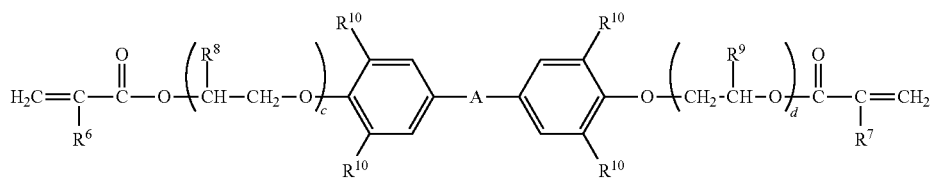

In the formula, $R^6$ and $R^7$ are each a hydrogen atom or a methyl group, $R^8$ and $R^9$ are each a hydrogen atom or a methyl group, $R^{10}$ is a hydrogen atom or a halogen atom, A is —O—, —S—, —(SO$_2$)—, —CO—, —CH$_2$—, —CH=CH—, —C(CH$_3$)$_2$", or —C(CH$_3$)(C$_6$H$_5$)—, c and d are each an integer of 1 or more, and (c+d) is 2 or more and 30 or less on average.

The polymerizable compound represented by the above formula (3) is usually obtained in the form of a mixture of molecules having different molecular weights. Therefore, c and d are shown as average values.

Specific examples of the compound represented by the above formula (3) include the following bisphenol A di(meth)acrylates:
2,2-bis[4-(methacryloyloxyethoxy)phenyl]propane ((c+d)=2, average molecular weight 452),
2,2-bis[4-(methacryloyloxydiethoxy)phenyl]propane ((c+d)=4, average molecular weight 540),
2,2-bis[4-(methacryloyloxypolyethoxy)phenyl]propane ((c+d)=7, average molecular weight 672),
2,2-bis[3,5-dibromo-4-(methacryloyloxyethoxy)phenyl] propane ((c+d)=2, average molecular weight 768),
2,2-bis(4-(methacryloyloxydipropoxy)phenyl)propane ((c+d)=4, average molecular weight 596),
2,2-bis[4-(acryloyloxydiethoxy)phenyl]propane ((c+d)=4, average molecular weight 512),
2,2-bis[4-(acryloyloxypolyethoxy)phenyl]propane ((c+d)=3, average molecular weight 466),
2,2-bis[4-(acryloyloxypolyethoxy)phenyl]propane ((c+d)=7, average molecular weight 642),
2,2-bis[4-(methacryloyloxypolyethoxy)phenyl]propane ((c+d)=10, average molecular weight 804),
2,2-bis[4-(methacryloyloxypolyethoxy)phenyl]propane ((c+d)=17, average molecular weight 1116), carbon atoms, and when a plurality of B are present, the plurality of B may be the same group or different groups.

The compound represented by the above formula (4) can be produced by reacting a polycarbonate diol with (meth)acrylic acid.

Examples of the polycarbonate diol to be used herein include the following. Specific examples thereof include polycarbonate diol (average molecular weight: 500 to 2000) obtained by phosgenation of trimethylene glycol, polycarbonate diol (average molecular weight: 500 to 2000) obtained by phosgenation of tetramethylene glycol, polycarbonate diol (average molecular weight: 500 to 2000) obtained by phosgenation of pentamethylene glycol, polycarbonate diol (average molecular weight: 500 to 2000) obtained by phosgenation of hexamethylene glycol, polycarbonate diol (average molecular weight: 500 to 2000) obtained by phosgenation of octamethylene glycol, polycarbonate diol (average molecular weight: 500 to 2000) obtained by phosgenation of nonamethylene glycol, polycarbonate diol (average molecular weight: 500 to 2000) obtained by phosgenation of triethylene glycol and tetramethylene glycol, polycarbonate diol (average molecular weight: 500 to 2000) obtained by phosgenation of tetramethylene glycol and hexamethylene diglycol, polycarbonate diol (average molecular weight: 500 to 2000) obtained by phosgenation of pentamethylene glycol and hexamethylene glycol, polycarbonate diol (average molecular weight: 500 to 2000) obtained by phosgenation of tetramethylene glycol and octamethylene glycol, polycarbonate diol (average molecular weight: 500 to 2000) obtained by phosgenation of hexamethylene glycol and octamethylene glycol, and polycarbonate diol (average molecular weight: 500 to 2000) obtained by phosgenation of 1-methyltrimethylene glycol.

As the compound represented by the above formula (4), commercially available products can be used without any limitation, and examples thereof include UH-100DA, UM-90 (3/1) DA, UM-90 (1/1) DA, UM-90 (1/3) DA, UH-100DM, UM-90 (3/1) DM, UM-90 (1/1) DM, and UM-90 (1/3) DM manufactured by Ube Industries, Ltd., and A-PC5650E manufactured by Shin-Nakamura Chemical Co., Ltd.

<(A1-4) Bifunctional (Meth)Acrylic Polymerizable Compound Having Urethane Bond>

The component (A1-4) is typically a reaction product of a polyol, a polyisocyanate, and a hydroxy group-containing (meth)acrylate. Examples of the polyisocyanate include hexamethylene diisocyanate, isophorone diisocyanate, lysine isocyanate, 2,2,4-hexamethylene diisocyanate, dimer acid diisocyanate, isopropylidenebis-4-cyclohexyl isocyanate, dicyclohexylmethane diisocyanate, norbornene diisocyanate, and methylcyclohexane diisocyanate.

On the other hand, examples of the polyol include polyalkylene glycol having a repeating unit of ethylene oxide or propylene oxide having 2 to 4 carbon atoms, or hexamethylene oxide, and polyester diol such as polycaprolactone diol. Examples of the polyol also include polycarbonate diol, polybutadiene diol, ethylene glycol, propylene glycol, 1,3-propanediol, 1,4-butanediol, 1,5-pentanediol, 1,6-hexanediol, 1,9-nonanediol, 1,8-nonanediol, neopentyl glycol, diethylene glycol, dipropylene glycol, 1,4-cyclohexanediol, and 1,4-cyclohexanedimethanol.

Examples of the hydroxy group-containing (meth)acrylate include 2-hydroxyethyl (meth)acrylate, 2-hydroxypropyl (meth)acrylate, 3-hydroxypropyl (meth)acrylate, 3-hydroxybutyl (meth)acrylate, and 4-hydroxybutyl (meth)acrylate.

Further, a reaction mixture obtained by further reacting a urethane prepolymer obtained by the reaction of the polyisocyanate and the polyol with a hydroxy group-containing (meth)acrylate such as 2-hydroxy (meth)acrylate, or a urethane (meth)acrylate which is a reaction mixture obtained by directly reacting the diisocyanate with a hydroxy group-containing (meth)acrylate such as 2-hydroxy (meth)acrylate can also be used.

As the bifunctional (meth)acrylic polymerizable compound having a urethane bond, commercially available products can be used without any limitation, and examples thereof include U-2PPA (molecular weight: 482), UA-122P (molecular weight: 1100), U-122P (molecular weight: 1100), U-108A, U-200PA, UA-511, U-412A, UA-4100, UA-4200, UA-4400, UA-2235PE, UA-160TM, UA-6100, UA-6200, U-108, UA-4000, and UA-512 manufactured by Shin-Nakamura Chemical Co., Ltd., and EB4858 (molecular weight: 454) manufactured by Daicel-UCB Co., Ltd., and UX-2201, UX3204, UX4101, 6101, 7101, and 8101 manufactured by Nippon Kayaku Co., Ltd.

<(A1-5) Other Bifunctional (Meth)Acrylic Polymerizable Compound>

Examples of the component (A1-5) include compounds having a (meth)acrylic group at both ends of an alkylene group which may have a substituent. The component (A1-5) preferably has an alkylene group having 6 to 20 carbon atoms. Specific examples thereof include 1,6-hexanediol diacrylate, 1,6-hexanediol dimethacrylate, 1,9-nonanediol diacrylate, 1,9-nonanediol dimethacrylate, 1,10-decanediol diacrylate, and 1,10-decanediol dimethacrylate.

Other examples of the component (A1-5) can also include bifunctional (meth)acrylic polymerizable compounds containing a sulfur atom. The sulfur atom preferably forms a part of the molecular chain as a sulfide group. Specific examples of the bifunctional (meth)acrylic polymerizable compound containing a sulfur atom include bis(2-methacryloyloxyethylthioethyl) sulfide, bis(methacryloyloxyethyl) sulfide, bis(acryloyloxyethyl) sulfide, 1,2-bis(methacryloyloxyethylthio) ethane, 1,2-bis(acryloyloxyethyl) ethane, bis(2-methacryloyloxyethylthioethyl) sulfide, bis(2-acryloyloxyethylthioethyl) sulfide, 1,2-bis(methacryloyloxyethylthioethylthio) ethane, 1,2-bis(acryloyloxyethylthioethylthio) ethane, 1,2-bis(methacryloyloxyisopropylthioisopropyl) sulfide, and 1,2-bis(acryloyloxyisopropylthioisopropyl) sulfide.

In the component (A1-1), the component (A1-2), the component (A1-3), the component (A1-4), and the component (A1-5) described above, a single component can be used, or a plurality of them as described above can be used. When a plurality of the components are used, the reference mass of the component (A1) is the total amount of the plurality of the components.

<(A2) Polyfunctional (Meth)Acrylic Polymerizable Compound>

Examples of the component (A2) include a compound represented by the following formula (5) (hereinafter may be simply referred to as component (A2-1)), a polyfunctional (meth)acrylic polymerizable compound having a urethane bond (hereinafter may be simply referred to as component (A2-2)), and a polyfunctional (meth)acrylic polymerizable compound not corresponding to the component (A2-1) and the component (A2-2) (hereinafter may be simply referred to as component (A2-3)).

<(A2-1) Compound Represented by the Following Formula (5)>

Examples of the polyfunctional (meth)acrylic polymerizable compound include a compound represented by the following formula (5).

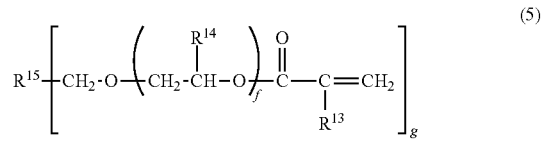

$$R^{15}\!\!\left[\text{CH}_2\text{-O}\!\!\left(\text{CH}_2\text{-}\overset{R^{14}}{\underset{}{\text{CH}}}\text{-O}\right)_{\!\!f}\!\overset{\text{O}}{\underset{}{\text{C}}}\text{-}\overset{}{\underset{R^{13}}{\text{C}}}\!\!=\!\!\text{CH}_2\right]_g \quad (5)$$

In the formula, $R^{13}$ is a hydrogen atom or a methyl group, $R^{14}$ is a hydrogen atom or an alkyl group having 1 to 2 carbon atoms, $R^{15}$ is a 3- to 6-valent organic group having 1 to 10 carbon atoms, f is a number of 0 to 3 on average, and g is a number of 3 to 6.

The alkyl group having 1 to 2 carbon atoms represented by $R^{14}$ is preferably a methyl group. Examples of the organic group represented by $R^{15}$ include groups derived from polyols, 3- to 6-valent hydrocarbon groups, and 3- to 6-valent urethane bond-containing organic groups.

Specific examples of the compound represented by the above formula (5) are as follows: trimethylolpropane trimethacrylate, trimethylolpropane triacrylate, tetramethylolmethane trimethacrylate, tetramethylolmethane triacrylate, tetramethylolmethane tetramethacrylate, tetramethylolmethane tetraacrylate, trimethylolpropane triethylene glycol trimethacrylate, trimethylolpropane triethylene glycol triacrylate, ditrimethylolpropane tetramethacrylate, and ditrimethylolpropane tetraacrylate.

<(A2-2) Polyfunctional (Meth)Acrylic Polymerizable Compound Having Urethane Bond>

The component (A2-2) is obtained by reacting the polyisocyanate described in the component (A1-4) with a polyol such as glycerin, trimethylolpropane, pentaerytritol, or dipentaerythritol, and is a compound having three or more (meth)acrylate groups in the molecule. As the component (A2-2), commercially available products can be used without any limitation, and examples thereof include U-4HA (molecular weight: 596, number of functional groups: 4), U-6HA (molecular weight: 1019, number of functional groups: 6), U-6LPA (molecular weight: 818, number of functional groups: 6), and U-15HA (molecular weight: 2300, number of functional groups: 15) manufactured by Shin-Nakamura Chemical Co., Ltd.

<(A2-3) Other Polyfunctional (Meth)Acrylic Polymerizable Compound>

The component (A2-3) is a compound obtained by modifying the terminal of a polyester compound with a (meth) acrylic group. Various polyester (meth)acrylate compounds are commercially available depending on the molecular weight of the polyester compound as a raw material and the amount of modification of the (meth)acrylic group, and these can be used. Specific examples thereof include a tetrafunctional polyester oligomer (molecular weight: 2500 to 3500, manufactured by Daicel-UCB Co., Ltd., EB80, etc.), a hexafunctional polyester oligomer (molecular weight: 6000 to 8000, manufactured by Daicel-UCB Co., Ltd., EB450, etc.), a hexafunctional polyester oligomer (molecular weight: 45000 to 55000, manufactured by Daicel-UCB Co., Ltd., EB1830, etc.), and a tetrafunctional polyester oligomer (particularly molecular weight: 10,000, manufactured by DKS Co., Ltd., GX8488B, etc.).

By using the component (A2) exemplified above (component (A2-1), component (A2-2), and component (A2-3)), the crosslinking density can be increased by curing, and the surface hardness of the cured body to be obtained can be increased. Therefore, in particular, in the case of laminating a cured body on an optical substrate, it is preferable to contain the component (A2). Among the components (A2), it is particularly preferable to use the component (A2-1).

In the component (A2-1), the component (A2-2), and the component (A2-3) described above, a single component can be used, or a plurality of them as described above can be used. When a plurality of the components are used, the reference mass of the component (A2) is the total amount of the plurality of the components.

<(A3) Monofunctional (Meth)Acrylic Polymerizable Compound>

Examples of the component (A3) include a compound represented by the following formula (6).

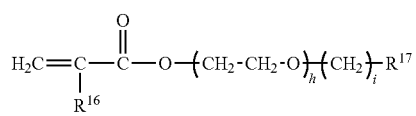

(6)

In the formula, $R^{16}$ is a hydrogen atom or a methyl group, $R^{17}$ is a hydrogen atom, a methyldimethoxysilyl group, a trimethoxysilyl group, or a glycidyl group, h is an integer of 0 to 10, and i is an integer of 0 to 20.

Specific examples of the compound represented by the above formula (6) are as follows.

Methoxypolyethylene glycol methacrylate (particularly average molecular weight: 293), methoxypolyethylene glycol methacrylate (particularly average molecular weight: 468), methoxypolyethylene glycol acrylate (particularly average molecular weight: 218), methoxypolyethylene glycol acrylate (particularly average molecular weight: 454), stearyl methacrylate, lauryl methacrylate, methyl acrylate, ethyl acrylate, butyl acrylate, octyl acrylate, lauryl acrylate, γ-methacryloyloxypropyltrimethoxysilane, γ-methacryloyloxypropylmethyldimethoxysilane, and glycidyl methacrylate.

<(A4) Vinyl Polymerizable Compound>

Examples of the vinyl polymerizable compound (A4) include methyl vinyl ketone, ethyl vinyl ketone, ethyl vinyl ether, styrene, vinylcyclohexane, butadiene, 1,4-pentadiene, divinyl sulfide, divinyl sulfone, 1,2-divinylbenzene, 1,3-divinyl-1,1,3,3-tetramethylpropanedisiloxane, diethylene glycol divinyl ether, divinyl adipate, divinyl sebacate, ethylene glycol divinyl ether, divinyl sulfoxide, divinylpersulfide, dimethyldivinylsilane, 1,2,4-trivinylcyclohexane, methyltrivinylsilane, N-vinylpyrrolidone, α-methylstyrene, and α-Methylstyrene dimer.

Among the vinyl polymerizable compounds (A4) exemplified above, α-methylstyrene and α-methylstyrene dimer function as a polymerization regulator to improve the moldability of the cured body.

<Blending Ratio of Each Component in Component (A)>

The radical polymerizable monomer (A) preferably contains the component (A1) and the component (A2), and contains the component (A3) and the component (A4) as necessary. When the total amount of the components (A) is 100 parts by mass, the respective components are preferably 10 to 90 parts by mass of the component (A1), 5 to 50 parts by mass of the component (A2), 0 to 20 parts by mass of the component (A3), and 0 to 20 parts by mass of the component (A4) in consideration of the hardness and mechanical properties of the cured body to be obtained. In particular, the components (A1) and (A2) more preferably contain 15 to 50 parts by mass of the component (A1-1) and 20 to 40 parts by mass of the component (A2-1). Preferred combinations of the components (A) include, as the component (A1), at least one polymerizable monomer selected from polyethylene glycol dimethacrylate (particularly a=9, b=0, average molecular weight 536), polyethylene glycol dimethacrylate (particularly a=14, b=0, average molecular weight 736), polyethylene glycol diacrylate (particularly a=9, b=0, average molecular weight 508), and polyethylene glycol diacrylate (particularly a=14, b=0, average molecular weight 708), and as the component (A2), at least one polymerizable monomer selected from trimethylolpropane trimethacrylate, trimethylolpropane triacrylate, tetramethylolmethane trimethacrylate, tetramethylolmethane triacrylate, tetramethylolmethane tetramethacrylate, and tetramethylolmethane tetraacrylate.

<(B) Benzotriazole-Based Ultraviolet Absorber Having Maximum Absorption Wavelength of 360 nm or More and Less than 380 nm>

In the present invention, in order to impart the ability to cut ultraviolet rays and blue light to the cured body, a benzotriazole-based ultraviolet absorber (B) having a maximum absorption wavelength of 360 nm or more and less than 380 nm (hereinafter may be simply referred to as component (B)) is contained. The benzotriazole-based ultraviolet absorber (component (B)) of the present invention is represented by the following formula (1).

In the present invention, the maximum absorption wavelength means a wavelength of a peak of maximum absorption (a peak of a convex spectrum) appearing in an absorption spectrum. In addition, a plurality of maximum absorption wavelengths may be confirmed, and in this case, at least one maximum absorption wavelength may be confirmed in the wavelength range specified in the present invention. For example, the above-described benzotriazole-based ultraviolet absorber having the maximum absorption wavelength of 360 nm or more and less than 380 nm means a benzotriazole-based ultraviolet absorber in which at least one of the maximum absorption wavelengths is present at 360 nm or more and less than 380 nm.

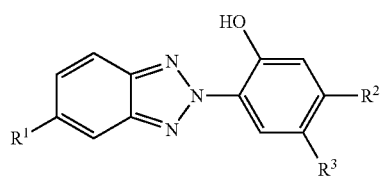

(1)

In the formula (1), $R^1$ represents a hydrogen atom, an alkyl group having 1 to 8 carbon atoms, an alkoxy group having 1 to 8 carbon atoms, a hydroxy group, a linear or branched monosubstituted amino group having 1 to 4 carbon atoms, a linear or branched disubstituted amino group having 1 to 4 carbon atoms, a nitro group, a carboxy group, an alkyloxycarbonyl group having 1 to 8 carbon atoms in the alkyl group, a hydroxyalkyl group having 1 to 8 carbon atoms, an alkylcarbonyloxyalkyl group having 1 to 8 carbon atoms in each alkyl group, a carboxyalkyl group having 1 to 3 carbon atoms in the alkyl group, an alkyloxycarbonylalkyl group in which the total number of carbon atoms in the alkyl group is 2 to 10, an aryl group, an acyl group, a sulfo group, or a cyano group; $R^2$ represents a hydroxy group, an alkoxy group having 1 to 8 carbon atoms, an alkylthio group having 1 to 8 carbon atoms, a linear or branched monosubstituted amino group having 1 to 4 carbon atoms, or a linear or branched disubstituted amino group having 1 to 4 carbon atoms; and $R^3$ represents a hydrogen atom, a hydroxy group, an alkyl or alkoxy group having 1 to 8 carbon atoms, a linear or branched monosubstituted amino group having 1 to 4 carbon atoms, or a linear or branched disubstituted amino group having 1 to 4 carbon atoms, and may be a cyclic structure in which $R^2$ and $R^3$ are crosslinked.

In the general formula (1), specific examples of $R^1$ include a hydrogen atom; a linear or branched alkyl group having 1 to 8 carbon atoms which may be substituted, such as a methyl group, an ethyl group, a propyl group, an isopropyl group, an n-butyl group, an iso-butyl group, a sec-butyl group, a tert-butyl group, an n-hexyl group, an n-octyl group, and a 2-ethylhexyl group; a linear or branched alkoxy group having 1 to 8 carbon atoms which may be substituted, such as a methoxy group, an ethoxy group, a propoxy group, an isopropoxy group, an n-butoxy group, an iso-butoxy group, a sec-butoxy group, a tert-butoxy group, an n-hexyloxy group, an n-octyloxy group, and a 2-ethylhexyloxy group; a hydroxy group; a carboxy group; a linear or branched alkyloxycarbonyl group having 1 to 8 carbon atoms of an alkyl group which may be substituted, such as a methoxycarbonyl group, an ethoxycarbonyl group, an isopropoxycarbonyl group, an n-butoxycarbonyl group, an isobutoxycarbonyl group, a sec-butoxycarbonyl group, a tert-butoxycarbonyl group, an n-hexyloxycarbonyl group, an n-octyloxycarbonyl group, and a 2-ethylhexyloxycarbonyl group; a linear or branched hydroxyalkyl group having 1 to 8 carbon atoms which may be substituted, such as a hydroxymethyl group, a hydroxyethyl group, a hydroxypropyl group, a hydroxybutyl group, a hydroxyhexyl group, and a hydroxyoctyl group; and a linear or branched alkylcarbonyloxyalkyl group having 1 to 8 carbon atoms in each alkyl group, which may be substituted, such as a methylcarbonyloxymethyl group, an ethylcarbonyloxymethyl group, a propylcarbonyloxymethyl group, a butylcarbonyloxymethyl group, a hexylcarbonyloxymethyl group, a heptylcarbonyloxymethyl group, an octylcarbonyloxymethyl group, ethylcarbonyloxyethyl group, a methylcarbonyloxyethyl group, an a propylcarbonyloxyethyl group, a butylcarbonyloxyethyl group, a hexylcarbonyloxyethyl group, a heptylcarbonyloxyethyl group, and an octylcarbonyloxyethyl group.

Also, specific examples of $R^2$ include a hydroxy group; a linear or branched alkoxy group having 1 to 8 carbon atoms which may be substituted, such as a methoxy group, an ethoxy group, a propoxy group, an isopropoxy group, an n-butoxy group, an isobutoxy group, a sec-butoxy group, a tert-butoxy group, an n-hexyloxy group, an n-octyloxy group, and a 2-ethylhexyloxy group; a linear or branched alkylthio group having 1 to 8 carbon atoms which may be substituted, such as a methylthio group, an ethylthio group, a propylthio group, an isopropylthio group, an n-butylthio group, an isobutylthio group, a sec-butylthio group, a tert-butylthio group, an n-hexylthio group, an n-octylthio group, and a 2-ethylhexylthio group; and a linear or branched amino group having 1 to 4 carbon atoms which may be substituted, such as a monomethylamino group, a dimethylamino group, a monoethylamino group, a diethylamino group, a mono-n-propylamino group, a di-n-propylamino group, a monoisopropylamino group, and a diisopropylamino group.

Specific examples of $R^3$ include a hydrogen atom; a hydroxy group; a linear or branched alkyl group having 1 to 8 carbon atoms which may be substituted, such as a methyl group, an ethyl group, a propyl group, an isopropyl group, an n-butyl group, an iso butyl group, a sec-butyl group, a tert-butyl group, an n-hexyl group, an n-octyl group, and a 2-ethylhexyl group; a linear or branched alkoxy group having 1 to 8 carbon atoms which may be substituted, such as a methoxy group, an ethoxy group, a propoxy group, an isopropoxy group, an n-butoxy group, an iso-butoxy group, a sec-butoxy group, a tert-butoxy group, an n-hexyloxy group, an n-octyloxy group, and a 2-ethylhexyloxy group; and a linear or branched amino group having 1 to 4 carbon atoms which may be substituted, such as a monomethylamino group, a dimethylamino group, a monoethylamino group, a diethylamino group, a mono-n-propylamino group, a di-n-propylamino group, a monoisopropylamino group, and a diisopropylamino group.

Also, in the case of a ring structure in which $R^2$ and $R^3$ are crosslinked, examples thereof include a methylenedioxy group and an ethylenedioxy group.

In the benzotriazole derivative compound represented by the general formula (1), $R^1$ is preferably a hydrogen atom, a methyl group, a methoxy group, an n-octyloxy group, a hydroxy group, a carboxy group, a methoxycarbonyl group, an ethoxycarbonyl group, an isopropoxycarbonyl group, an n-butoxycarbonyl group, an isobutoxycarbonyl group, a sec-butoxycarbonyl group, a tert-butoxycarbonyl group, an n-hexyloxycarbonyl group, an n-octyloxycarbonyl group, a hydroxyethyl group, a methylcarbonyloxyethyl group, or heptylcarbonyloxyethyl group; $R^2$ is preferably a methoxy group, an ethoxy group, an n-octyloxy group, a dimethylamino group, or a diethylamino group; $R^3$ is preferably a hydrogen atom, a methyl group, an ethyl group, a methoxy group, an ethoxy group, an n-octyloxy group, or a dimethylamino group; and in the case of a ring structure in which $R^2$ and $R^3$ are crosslinked, a methylenedioxy group is preferable.

Here, $R^1$, $R^2$ and $R^3$ may be selected so as to coincide with the maximum absorption wavelengths and SP values specified in the present invention, but considering the maximum absorption wavelengths, it is preferable to select an electron-donating substituent for $R^2$ or $R^2$ and $R^3$ and/or an electron-withdrawing substituent for $R^1$. Examples of the electron-donating substituent include a hydroxy group, an alkoxy group having 1 to 8 carbon atoms, an alkylthio group having 1 to 8 carbon atoms, a linear or branched monosubstituted amino group having 1 to 4 carbon atoms, and a linear or branched disubstituted amino group having 1 to 4 carbon atoms. Examples of the electron-withdrawing substituent include a nitro group, a carboxy group, an alkyloxycarbonyl group, an acyl group, a sulfo group, and a cyano group.

The benzotriazole derivative compound represented by the general formula (1) of the present invention is appropriately selected depending on the SP value of the radical polymerizable compound (A) to be used, and examples thereof include 2-(2-hydroxy-4-dimethylaminophenyl)-5-methyloxycarbonyl-2H-benzotriazole, 2-(2-hydroxy-4-dimethylaminophenyl)-5-ethyloxycarbonyl-2H-benzotriazole,
2-(2-hydroxy-4-dimethylaminophenyl)-5-octyloxycarbonyl-2H-benzotriazole,
2-(2-hydroxy-4-dimethylaminophenyl)-5-methyl-2H-benzotriazole,
2-(2-hydroxy-4-diethylaminophenyl)-5-butyloxycarbonyl-2H-benzotriazole,
2-(2-hydroxy-4-dimethylamino-5-methylphenyl)-5-methyloxycarbonyl-2H-benzotriazole,
2-(2-hydroxy-4-dimethylamino-5-methylphenyl)-5-butyloxycarbonyl-2H-benzotriazole,
2-(2-hydroxy-4-dimethylamino-5-methylphenyl)-5-octyloxycarbonyl-2H-benzotriazole, 2-(2-hydroxy-4-dimethylamino-5-methylphenyl)-5-methyl-2H-benzotriazole,
2-(2-hydroxy-4,5-dimethoxyphenyl)-5-methyloxycarbonyl-2H-benzotriazole,
2-(2-hydroxy-4,5-dimethoxyphenyl)-5-butyloxycarbonyl-2H-benzotriazole,
2-(2-hydroxy-4,5-dimethoxyphenyl)-5-octyloxycarbonyl-2H-benzotriazole,
2-(2-hydroxy-4,5-dimethoxyphenyl)-5-methyl-2H-benzotriazole,
6-(5-heptylcarbonyloxyethyl-2H-benzotriazol-2-yl)benzo[1,3]dioxol-5-ol,
6-(5-isoheptylcarbonyloxyethyl-2H-benzotriazol-2-yl)benzo[1,3]dioxol-5-ol,
6-(5-octyloxy-2H-benzotriazol-2-yl)benzo[1,3]dioxol-5-ol,
6-(5-methylcarbonyloxyethyl-2H-benzotriazol-2-yl)benzo[1,3]dioxol-5-ol,
7-(5-methyloxycarbonyl-2H-benzotriazol-2-yl)benzo[1,4]dioxin-6-ol,
7-(5-butyloxycarbonyl-2H-benzotriazol-2-yl)benzo[1,4]dioxin-6-ol,
7-(5-octyloxycarbonyl-2H-benzotriazol-2-yl)benzo[1,4]dioxin-6-ol, and
7-(5-methyl-2H-benzotriazol-2-yl)benzo[1,4]dioxin-6-ol.

In the present invention, it is important to select the radical polymerizable monomer (A) and the benzotriazole-based ultraviolet absorber (B) so that the absolute value of the difference in SP values between the radical polymerizable monomer (A) and the benzotriazole-based ultraviolet absorber (B) is 5.5 $(cal/cm^3)^{1/2}$ or less. When the absolute value of the difference in the SP values is within this range, the ultraviolet absorber (B) is less likely to bleed-out or the like, and thus the ability to cut ultraviolet rays and blue light can be stably maintained for a long period of time, which is preferable. The absolute value of the difference in the SP values is more preferably 4.5 $(cal/cm^3)^{1/2}$ or less.

For example, when the component (A) having an SP value of 9.5 to 10.0 is selected, the following benzotriazole compounds can be suitably used: 2-(2-hydroxy-4-dimethylaminophenyl)-5-octyloxycarbonyl-2H-benzotriazole, 2-(2-hydroxy-4-dimethylamino-5-methylphenyl)-5-butyloxycarbonyl-2H-benzotriazole, 2-(2-hydroxy-4-dimethylamino-5-methylphenyl)-5-octyloxycarbonyl-2H-benzotriazole, 2-(2-hydroxy-4,5-dimethoxyphenyl)-5-butyloxycarbonyl-2H-benzotriazole, 2-(2-hydroxy-4,5-dimethoxyphenyl)-5-octyloxycarbonyl-2H-benzotriazole, 6-(5-heptylcarbonyloxyethyl-2H-benzotriazol-2-yl)benzo[1,3]dioxol-5-ol, 6-(5-isoheptylcarbonyloxyethyl-2H-benzotriazol-2-yl)benzo[1,3]dioxol-5-ol, 6-(5-octyloxy-2H-benzotriazol-2-yl)benzo[1,3]dioxol-5-ol, 7-(5-butyloxycarbonyl-2H-benzotriazol-2-yl)benzo[1,4]dioxin-6-ol, and 7-(5-octyloxycarbonyl-2H-benzotriazol-2-yl)benzo[1,4]dioxin-6-ol.

The absorption coefficient of the component (B) is preferably in a range of 10 to 200 (L/(g·cm)) in order to achieve good handling and exhibit the effects efficiently. By satisfying this range, it is possible to form a cured body having an effect excellent in the ability to cut ultraviolet rays and blue light without lowering the strength of the cured body.

In addition, when the blending amount of the component (B) is 0.1 to 5 parts by mass per 100 parts by mass of the component (A), a cured body having an effect excellent in the ability to cut ultraviolet rays and blue light can be formed without further lowering the strength of the cured body. In order to further enhance the effect, the blending amount of the compound (B) is more preferably 0.3 to 3 parts by mass.

<(C) Ultraviolet Absorber Having Maximum Absorption Wavelength of Less than 360 nm>

The curable composition for an optical material of the present invention further contains (C) an ultraviolet absorber having a maximum absorption wavelength of less than 360 nm (hereinafter may be simply referred to as "component (C)"). The component (C) is an ultraviolet absorber having a maximum absorption wavelength of less than 360 nm which is selected from a (C1) benzotriazole compound (hereinafter, sometimes simply referred to as "component (C1)"), a (C2) benzophenone compound (hereinafter, sometimes simply referred to as "component (C2)"), and a (C3) triazine compound (hereinafter, sometimes simply referred to as "component (C3)"). By containing the component (C), ultraviolet light in the vicinity of 300 nm can be sufficiently cut, and the weather resistance of the cured body to be obtained, particularly the cured body when laminated with an optical substrate, can be improved.

The component (C) does not include a compound corresponding to the component (B).

<(C1) Benzotriazole Compound>

As the benzotriazole compound, known compounds having a maximum absorption wavelength of less than 360 nm can be used, and examples thereof include 2-(2-hydroxy-5-methylphenyl)-2H-benzotriazole, 2-(3-tert-butyl-2-hydroxy-5-methylphenyl)-5-chloro-2H-benzotriazole, 2-(3,5-di-tert-pentyl-2-hydroxyphenyl)-2H-benzotriazole, 2-(2H-benzotriazol-2-yl)-4-methyl-6-(3,4,5,6-tetrahydrophthalimidylmethyl)phenol, 2-(2-hydroxy-5-tert-octylphenyl)-2H-benzotriazole, 2-(2H-benzotriazol-2-yl)-4,6-bis(1-methyl-1-phenylethyl)phenol, 2,2'-methylenebis[6-(2H-benzotriazol-2-yl)-4-(1,1,3,3-tetramethylbutyl)phenol], and 2-(2H-benzotriazol-2-yl)-4-tert-butylphenol.

<(C2) Benzophenone Compound>

As the benzophenone compound, known compounds having a maximum absorption wavelength of less than 360 nm can be used, and examples thereof include 2,4-dihydroxybenzophenone, 2-hydroxy-4-methoxybenzophenone, 2-hydroxy-4-octyloxybenzophenone, 4-dodecyloxy-2-hydroxybenzophenone, 2,2',4,4'-tetrahydroxybenzophenone, 2,2'-dihydroxy-4-methoxybenzophenone, and 2,2'-dihydroxy-4,4'-dimethoxybenzophenone.

<(C3) Triazine Compound>

As the triazin compound, known compounds having a maximum absorption wavelength of less than 360 nm can be used, and examples thereof include 2-(4,6-diphenyl-1,3,5-triazin-2-yl)-5-[2-(2-ethylhexanoyloxy)ethoxy]phenol, 2,4-bis(2-hydroxy-4-butyroxyphenyl)-6-(2,4-bis-butyroxyphenyl)-1,3,5-triazine, and 2-[4-[(2-hydroxy-3-(2'-ethyl)hexyl)oxy]-2-hydroxyphenyl]-4,6-bis(2,4-dimethylphenyl)-1,3,5-triazine.

As the component (C), one of the component (C1), the component (C2), and the component (C3) may be used alone, or two or more of them may be used in combination. Among these, the (C2) benzophenone compound component having a largest absorption wavelength in the range of 270 nm to 300 nm is particularly preferable because ultraviolet rays can be favorably cut in a wide range when combined with the component (B). Examples of the (C2) benzophenone compound component having a largest absorption wavelength in the range of 270 nm to 300 nm include 2,4-dihydroxybenzophenone, 2-hydroxy-4-methoxybenzophenone, 2-hydroxy-4-octyloxybenzophenone, and 2,2'-dihydroxy-4,4'-dimethoxybenzophenone.

In the present invention, the largest absorption wavelength means a wavelength showing the largest absorption in an absorption spectrum.

The absolute value of the difference in the SP values between the component (A) and the component (C) is preferably 5.5 $(cal/cm^3)^{1/2}$ or less. The absolute value of the difference in the SP values is more preferably 5.0 $(cal/cm^3)^{1/2}$ or less. When the absolute value of the difference in the SP values falls within this range, the component (C) is less likely to bleed-out, which is preferable.

In the present invention, the absorption coefficient of the component (C) at the maximum wavelength is preferably in the range of 10 to 200 (L/(g·cm)). By satisfying this range, an effect of excellent weather resistance can be obtained without lowering the strength of the cured body to be obtained, particularly the cured body when laminated with an optical substrate.

When the blending amount of the component (C) is 1 to 5 parts by mass per 100 parts by mass of the component (A), the composition has good ultraviolet ray cutting ability. In particular, the amount is preferably 1 to 4 parts by mass in order to increase the weather resistance without lowering the strength of the cured body.

<(D) Radical Polymerization Initiator>

The radical polymerization initiator (D) used in the present invention (hereinafter may be simply referred to as "component (D)") will be described.

In the present invention, a radical polymerization initiator such as a known thermal polymerization initiator or photopolymerization initiator capable of generating a radical can be used without any particular limitation, and typical examples of the radical polymerization initiator include, as the thermal polymerization initiator, diacyl peroxides such as benzoyl peroxide, p-chlorobenzoyl peroxide, decanoyl peroxide, lauroyl peroxide, and acetyl peroxide; peroxy esters such as tert-butyl peroxy-2-ethylhexanoate, tert-butyl peroxyneodecanoate, cumyl peroxyneodecanoate, and tert-butyl peroxybenzoate; percarbonates such as diisopropyl peroxydicarbonate and di-sec-butyl peroxydicarbonate; and azo compounds such as azobisisobutyronitrile.

As the photopolymerization initiator, an acetophenone-based or acylphosphine-based compound can be employed. Specific examples thereof include benzophenone; acetophenone-based compounds such as 2,2-dimethoxy-1,2-diphenylethan-1-one, 1-hydroxycyclohexyl phenyl ketone, 2-hydroxy-2-methyl-1-phenylpropan-1-one, 1-[4-(2-hydroxyethoxy)-phenyl]-2-hydroxy-2-methyl-1-propan-1-one, 2-methyl-1-[4-(methylthio)phenyl]-2-morpholinopropan-1-one, and 2-benzyl-2-dimethylamino-1-(4-morpholinophenyl)-butanone-1,1-(4-isopropylphenyl)-2-hydroxy-2-methylpropan-1-one; α-dicarbonyl-based compounds such as 1,2-diphenylethanedione and methylphenylglycoxylate; acylphosphine oxide-based compounds such as 2,6-dimethylbenzoyl diphenylphosphine oxide, phenylbis(2,4,6-trimethylbenzoyl) phosphine oxide, bis(2,6-dimethoxybenzoyl)-2,4,4-trimethyl-pentylphosphine oxide, 2,4,6-trimethylbenzoyl diphenylphosphine oxide, 2,4,6-trimethylbenzoyl diphenylphosphinic acid methyl ester, 2,6-dichlorbenzoyl diphenylphosphine oxide, and 2,6-dimethoxybenzoyl diphenylphosphine oxide; and 1,2-octanedione-1-[4-(phenylthio)-2-(o-benzoyloxime).

These radical polymerization initiators may be used alone or in combination of two or more thereof. A thermal polymerization initiator and a photopolymerization initiator may be used in combination. When a photopolymerization initiator is used, a known polymerization accelerator such as a tertiary amine can be used in combination.

In the present invention, the amount of the radical polymerization initiator to be used is 0.05 to 0.5 parts by mass, preferably 0.05 to 0.4 parts by mass, per 100 parts by mass of the total amount of the component (A). In particular, in the case of obtaining a cured body using a photopolymerization initiator, since the component (B) and the component (C), which are ultraviolet absorbers, are added, the reaction of the photopolymerization initiator is inhibited and curing can be suppressed. Therefore, in order to cure the cured body by photopolymerization without lowering the strength of the cured body, the ratio of the sum of the mass of the component (B) and the mass of the component (C) to the mass of the component (D) is preferably from 6:1 to 30:1, and more preferably from 10:1 to 25:1.

<(E) Light-Absorbing Compound Having Maximum Absorption Wavelength in a Range of 400 nm or More and 450 nm or Less>

The curable composition for an optical material of the present invention preferably contains (E) a light-absorbing compound having a maximum absorption wavelength in a range of 400 nm or more and 450 nm or less.

The light-absorbing compound (E) having a maximum absorption wavelength in the range of 400 nm or more and 450 nm or less (hereinafter may be simply referred to as "component (E)") used in the present invention is preferably blended in order to more effectively cut blue light. Any compound having a maximum absorption wavelength in the range of more than 400 nm and 450 nm or less can be used without particular limitation, and commercially available compounds can also be used without particular limitation. Among them, in order to be easily dispersed in the curable composition for an optical material of the present invention, specific examples thereof include porphyrin compounds, carotenoid-based compounds, and cyanine-based compounds. The component (E) does not include compounds corresponding to the component (B) and the component (C).

As the porphyrin-based compound, known compounds can be used without any limitation.

As the carotenoid-based compound, carotenes can be used. Specifically, zeta-carotene can be used. The zeta-carotene can be synthesized by a known method.

As the cyanine-based compound, commercially available compounds can be used without any limitation. For example, cyanine compounds and merocyanine compounds commercially sold by Tokyo Chemical Industry Co., Ltd. can be used. Further, trade name FDB-009 and the like manufactured by Yamada Chemical Co., Ltd. can be used.

Among these components (E), porphyrin compounds are preferred, and porphyrin compounds represented by the following general formula (7) containing a metal such as copper, magnesium, zinc, cobalt, titanium, iron or vanadium as a central metal are particularly preferred.

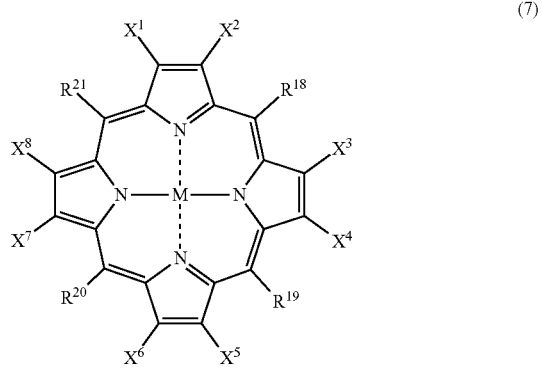

(7)

In the formula, $X^1$ to $X^8$ are each a substituent selected from a hydrogen atom, a halogen atom, a linear, branched or cyclic alkyl group, a linear, branched or cyclic alkoxy group, a substituted or unsubstituted ethenyl group, a substituted or unsubstituted ethynyl group, a substituted or unsubstituted aryl group, a substituted or unsubstituted aryloxy group, a substituted or unsubstituted aryloxycarbonyl group, a substituted or unsubstituted alkylthio group, a substituted or unsubstituted arylthio group, a substituted or unsubstituted aralkyl group, a substituted or unsubstituted aralkyloxy group, a linear, branched or cyclic halogenoalkyl group, a linear, branched or cyclic halogenoalkoxy group, a substituted or unsubstituted acyl group, a linear, branched or cyclic alkoxyalkyl group, a linear, branched or cyclic alkoxyalkoxyalkyl group, a substituted or unsubstituted aryloxyalkyl group, a substituted or unsubstituted aralkyloxyalkyl group, and a linear, branched or cyclic halogenoalkoxyalkyl group.

Also, the groups adjacent to each other selected from $X^1$ and $X^8$ may be bonded to each other to form a substituted or unsubstituted aromatic ring together with the substituted carbon atom.

$R^{18}$ to $R^{21}$ are each a substituted or unsubstituted aryl group, and M is two hydrogen atoms, two monovalent metal atoms, a divalent metal atom, a trivalent substituted metal atom, a tetravalent substituted metal atom, or a metal oxide atom.

Among them, in order to exhibit a higher effect in the present invention, $X^1$ to $X^8$ are each preferably a hydrogen atom, a halogen atom, a linear alkyl group having 1 to 10 carbon atoms, a branched alkyl group having 3 to 10 carbon atoms, or a cyclic alkyl group having 3 to 10 carbon atoms, $R^{18}$ to $R^{21}$ are each preferably a substituted or unsubstituted aryl group, and M is preferably copper, magnesium, zinc, cobalt, titanium, iron, vanadium, or vanadium oxide.

As the porphyrin compound represented by the general formula (7), a commercially available porphyrin compound can be used without any limitation, and for example, porphyrin compounds commercially available from Tokyo Chemical Industry Co., Ltd., Yamada Chemical Co., Ltd., and the like can be used.

Among them, in order to form a cured body having excellent performance, it is preferable to use the porphyrin compound having a maximum absorption wavelength in the range of 405 nm or more and 440 nm or less, and it is more preferable to use the porphyrin compound having a maximum absorption wavelength in the range of 410 nm or more and 435 nm or less.

These porphyrin compounds represented by the general formula (7) may be used alone or in combination of two or more thereof.

In the present invention, the molar absorption coefficient of the component (E) is preferably in the range of 50 to 2000 (L/(g·cm)) in order that the component (E) is easy to handle and efficiently exhibits the effects of the present invention. By satisfying this range, the amount of the component (E) added can be selected within a range in which the strength of the cured body to be obtained, particularly the cured body when laminated with an optical substrate, is not decreased, and blue light can be cut more efficiently.

In addition, the component (E) preferably has a half-value width of the maximum absorption wavelength of 40 nm or less. By satisfying this range, it is possible to efficiently cut blue light while keeping low the initial coloration (YI) of the cured body to be obtained, particularly the cured body when laminated with an optical substrate. In addition, since the amount of the component (F) added, which will be described later, can be reduced, a cured body having high transparency (high luminous transmittance) can be obtained. In order to further enhance the effect, the half-value width of the component (E) is more preferably 35 nm or less, and still more preferably 30 nm or less. The half-value width is preferably as narrow as possible because it can be controlled more, but it should be 5 nm or more in consideration of industrial production of the component (E). Therefore, the half-value width of the maximum absorption wavelength of the component (E) is preferably 5 nm or more and 40 nm or less, more preferably 5 nm or more and 35 nm or less, and still more preferably 5 nm or more and 30 nm or less.

Specific examples of the preferred component (E) include cobalt(II) tetraphenylporphyrin, zinc(II) tetraphenylporphyrin, and zinc(II) 2,3,7,8,12,13,17,18-octaethyl-21H,23H-porphyrin. In addition, a commercially available product can be used without any limitation, and examples thereof include FDB-001 and FDB-002 manufactured by Yamada Chemical Co., Ltd.

The half-value width of the maximum absorption wavelength is calculated by reading the wavelength A1 (nm) and the wavelength A2 (nm) at which the absorbance at the maximum absorption wavelength becomes a half value and obtaining the absolute value of the difference between these wavelengths.

The component (E) may be appropriately selected depending on the intended use. In this case, a mixture of two or more kinds may be used.

The blending amount when the component (E) is blended is not particularly limited, and may be appropriately determined depending on the intended use or the like. In particular, the amount is preferably 0.001 to 1 part by mass per 100 parts by mass of the component (A). By satisfying this range, it is possible to form the cured body to be obtained without lowering the strength of the cured body, particularly the cured body when laminated with an optical substrate, and it is possible to impart high ultraviolet cutting ability. Therefore, the amount is more preferably 0.001 to 0.5 parts by mass, and even more preferably 0.002 to 0.3 parts by mass, per 100 parts by mass of the component (A).

<(F) Dye Having Maximum Absorption Wavelength in a Range of 540 nm or More and 650 nm or Less>

The curable composition for an optical material of the present invention may contain a dye having a maximum absorption wavelength in a range of 540 to 650 nm (hereinafter may be simply referred to as "component (F)"). In particular, the component (F) more preferably has a maximum absorption wavelength in the range of 540 to 620 nm.

In the present invention, the cured body to be obtained, particularly the cured body when laminated with an optical substrate, cuts long-wavelength ultraviolet rays and blue light. Therefore, the cured body may be colored yellow due to the component (B). Therefore, in order to reduce this coloring, it is preferable to blend the component (F).

The component (F) can be divided into the following two components by the action and effect. That is, it can be divided into a (F1) dye capable of adjusting the color tone (hereinafter sometimes simply referred to as "component (F1)") and a (F2) dye capable of adjusting the color tone and imparting antiglare performance (hereinafter sometimes simply referred to as "component (F2)").

<Component (F1)>

Specific examples of the component (F1) include phthalocyanine-based compounds, anthraquinone-based compounds, and indigo-based compounds. The component (F1) can adjust the color tone as a bluing agent. As the component (F1), known commercially available components can be used without any limitation. For example, violet and blue dyes of a dye (product name: Diaresin) manufactured by Mitsubishi Chemical Corporation or a dye (product name: Kayaset) manufactured by Nippon Kayaku Co., Ltd. can be used. Specific examples thereof include trade names: Diaresin Blue J, Diaresin Violet D, Diaresin Violet RR, Diaresin Blue K, and Kayaset Blue FR.

In the present invention, the absorption coefficient of the component (F1) is preferably in the range of 10 to 200 (L/(g·cm)) in order that the component (F1) is easy to handle and efficiently exhibits the effects of the present invention. The half-value width of the maximum absorption wavelength of the component (F1) is usually in the range of 50 to 150 nm.

In addition, the component (F1) may be appropriately selected depending on the intended use. In this case, a mixture of two or more kinds may be used.

In the present invention, the blending amount when the component (F1) is blended is not particularly limited, but is preferably 0.001 to 1 part by mass, more preferably 0.005 to 0.5 parts by mass, per 100 parts by mass of the component (A). In order to particularly reduce coloring of the cured body to be obtained, particularly the cured body when laminated with an optical substrate, the mass ratio of the component (B) to the component (F1) is preferably 100: 0.005 to 10, and more preferably 100:0.05 to 5.

<Component (F2)>

Among the dyes having a maximum absorption wavelength in the range of 540 to 650 nm, there is also a compound that imparts bluing performance and antiglare performance (component (F2)). By blending the component (F2), it is possible to reduce glare of sunlight, headlights of automobiles, and the like, and discomfort, blurred contrast, visual fatigue, and the like associated therewith. Specific examples of the component (F2) used for the above purpose include tetraazaporphyrin compounds and neodymium compounds such as neodymium phosphate, neodymium carbonate, neodymium sulfate, neodymium acetate, neodymium nitrate, and neodymium oxide.

Among these compounds, it is particularly preferable to use a tetraazaporphyrin compound represented by the general formula (8).

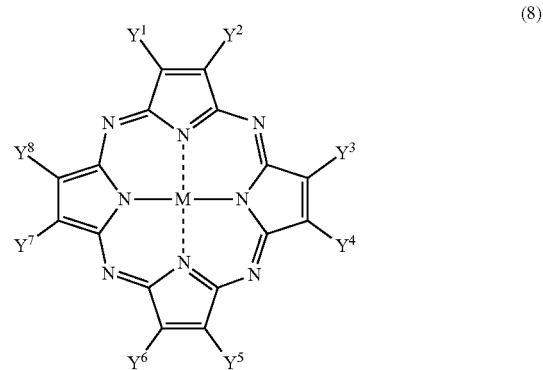

(8)

In the formula (8), $Y^1$ to $Y^8$ each independently represent a hydrogen atom, a halogen atom, a nitro group, a cyano group, a hydroxy group, an amino group, a carboxy group, a sulfonic acid group, a linear, branched or cyclic alkyl group having 1 to 20 carbon atoms, a linear, branched or cyclic alkoxy group having 1 to 20 carbon atoms, an aryloxy group having 6 to 20 carbon atoms, a monoalkylamino group having 1 to 20 carbon atoms, a dialkylamino group having 2 to 20 carbon atoms, a dialkylamino group having 7 to 20 carbon atoms, an aralkyl group having 7 to 20 carbon atoms, an aryl group having 6 to 20 carbon atoms, a heteroaryl group, an alkylthio group having 6 to 20 carbon atoms, or an arylthio group having 6 to 20 carbon atoms, and may form a ring excluding an aromatic ring via a linking group; and M represents two hydrogen atoms, a divalent metal atom, a divalent mono-substituted metal atom, a trivalent substituted metal atom, a tetravalent substituted metal atom, or a metal oxide atom.

As the tetraazaporphyrin compound represented by the general formula (8), a commercially available compound can be used without any limitation, and for example, tetraazaporphyrin compounds commercially available from Tokyo Chemical Industry Co., Ltd., Yamada Chemical Co., Ltd., Yamamoto Chemicals, Inc., and the like can be used.

Among the tetraazaporphyrin compounds represented by the general formula (8), in order to form a cured body having excellent antiglare performance, it is preferable to use a tetraazaporphyrin compound having a maximum absorption wavelength in the range of 560 nm or more and 620 nm or less, and it is more preferable to use a tetraazaporphyrin compound having a maximum absorption wavelength in the range of 580 nm or more and 610 nm or less.

In the present invention, the absorption coefficient of the component (F2) is preferably in the range of 10 to 1000 (L/(g·cm)) in order that the component (F2) is easy to handle and efficiently exhibits the effects. By satisfying this range, the amount of the component (F) added can be selected within a range in which the strength of the cured body to be obtained and the cured body when laminated with an optical substrate is not decreased, and an effect of excellent antiglare performance can be obtained. In order to further enhance the effect, the absorption coefficient of the compound (F2) is more preferably 25 to 800 (L/(g·cm)), and still more preferably 50 to 500 (L/(g·cm)).

In addition, in order for the component (F2) to further exhibit the antiglare effect, the half-value width of the maximum absorption wavelength of the component (F2) is preferably 40 nm or less. By satisfying this range, the cured body to be obtained and the cured body when laminated with an optical substrate can exhibit antiglare performance. That is, it is possible to reduce glare of sunlight, headlights of automobiles, and the like, and discomfort, blurred contrast, visual fatigue, and the like associated therewith. In order to further enhance the effect, the half-value width of the component (F2) is more preferably 35 nm or less, and still more preferably 30 nm or less. The half-value width is preferably as narrow as possible because it can be controlled more, but it should be 5 nm or more in consideration of industrial production of the component (F2). Therefore, the half-value width of the maximum absorption wavelength of the component (F2) is preferably 5 nm or more and 40 nm or less, more preferably 5 nm or more and 35 nm or less, and still more preferably 5 nm or more and 30 nm or less. As the component (F2), a commercially available product can be used without any limitation, and examples thereof include FDG-005, FDG-006, FDG-007, and FDR-001 manufactured by Yamada Chemical Co., Ltd., and PD-320 manufactured by Yamamoto Chemicals, Inc.

The component (F2) may be appropriately selected depending on the intended use. In this case, a mixture of two or more kinds may be used.

The blending amount when the component (F2) is used is not particularly limited, and may be appropriately determined depending on the intended use or the like. In particular, the amount is preferably 0.005 to 0.5 parts by mass per 100 parts by mass of the component (A). By satisfying this range, it is possible to impart highly effective antiglare performance without lowering the strength of the cured body to be obtained and the cured body when laminated with an optical substrate. Therefore, the blending amount of the component (F2) is more preferably 0.01 to 1 parts by mass, and even more preferably 0.005 to 0.2 parts by mass, per 100 parts by mass of the component (A).

<Other Additives>

The curable composition for an optical material of the present invention may contain known additives in addition to the above-described blending agents within a range that does not impair the effects of the present invention. For example, various stabilizers such as a surfactant, a release agent, an infrared absorber, an ultraviolet stabilizer, an antioxidant, a coloring inhibitor, an antistatic agent, a fluorescent dye, a dye, a pigment, and a fragrance, additives, and a polymerization regulator can be mixed as necessary.

Examples of the stabilizer include a hindered amine light stabilizer, a hindered phenol antioxidant, a phenol-based radical scavenger, and a sulfur-based antioxidant. The amount of the stabilizer added is preferably 0.01 to 10 parts by mass, and more preferably 0.1 to 5 parts by mass, per 100 parts by mass of the component (A).

As the surfactant, known surfactants such as silicone-based surfactants having a silicone chain (polyalkylsiloxane unit) as a hydrophobic group and fluorine-based surfactants having a fluorocarbon chain can be used without any limitation. By adding the surfactant, it becomes possible to improve the wettability with respect to the optical substrate and to prevent the occurrence of poor appearance without adversely affecting the adhesion when an optical material is formed by laminating the cured body of the present invention and the optical substrate by a coating method.

As the silicone-based surfactant and the fluorine-based surfactant which can be used in the present invention, commercially available products can be used without any limitation, and for example, "L-7001", "L-7002", "L-7604", and "FZ-2123" manufactured by Dow Corning Toray Co., Ltd., "Megafac F-470", "Megafac F-1405", and "Megafac F-479" manufactured by DIC Corporation, and "Fluorad FC-430" manufactured by Sumitomo 3M Limited. can be preferably used. When the surfactant is used, two or more kinds thereof may be used as a mixture. The amount of the surfactant added is not particularly limited, but is preferably 0.001 to 1 part by mass, more preferably 0.01 to 0.5 parts by mass, per 100 parts by mass of the component (A).

<Production Method of Cured Body>

The curable composition for an optical material of the present invention can be produced by a known method. For example, the curable composition for an optical material can be produced by kneading and dissolving each component.

With respect to the cured body of the present invention, there are also no particular limitations, and a known method of curing the curable composition for an optical material can be employed. Specifically, a radical polymerization initiator (D) is used, and curing can be performed by heat, irradiation with ultraviolet rays (UV rays), α-rays, β-rays, γ-rays or the like, or a combination of both.

In addition, there are also no particular limitations on the cured body when laminated with an optical substrate, and a known method can be employed, and examples thereof include a method of applying and curing a curable composition for an optical material on the optical substrate by a coating method, and a method of laminating a cured body obtained by curing a curable composition for an optical material in advance and the optical substrate, and in the present invention, a coating method is preferably used. In addition, in the case of a method of obtaining an optical material by a coating method, it is preferable to employ photocuring because a uniform film thickness can be obtained.

When the curable composition for an optical material of the present invention is photocured, among the curing conditions, particularly the UV intensity influences the properties of the cured body to be obtained. The illumination conditions are affected by the type and amount of the photopolymerization initiator and the type of the monomer, and thus cannot be limited in general. However, in general, it is preferable to select conditions such that UV light of 50 to 500 mW/cm$^2$ is irradiated at a wavelength of 365 nm for a time of 0.5 to 5 minutes.

When the curable composition for an optical material of the present invention is thermally cured, a method of starting curing at a relatively low temperature, slowly raising the temperature, and curing at a high temperature at the end is suitable. The temperature and the curing time are affected by the type and amount of the thermal polymerization initiator and the type of the monomer, and therefore cannot be limited in general. It is preferable to determine the optimum temperature and time according to these conditions in advance, but it is preferable to select conditions such that curing is completed in 2 to 24 hours.

In the case of producing an optical material by a coating method, a cured body can be obtained by applying the curable composition for an optical material of the present invention mixed with a photopolymerization initiator onto an optical substrate by a spin coating method or the like, placing it in an inert gas such as nitrogen, and then performing UV irradiation. Then, in order to enhance adhesion between the cured body and an optical substrate such as a plastic lens, it is preferable to perform heat treatment in a temperature range of 80 to 120° C. for about 0.5 to 5 hours. In this manner, an optical material in which an optical substrate such as a plastic lens, another layer such as a primer coating layer formed as necessary, and a cured body are laminated in this order can be obtained.

The thickness of the cured body of the present invention may be appropriately set within a range in which the effects of the present invention are exhibited. The thickness of the cured body when laminated with an optical substrate is preferably 5 to 70 μm in consideration of the ability to cut ultraviolet rays and blue light and the smoothness of the cured body to be formed. When the cured body is used alone, a range of 0.05 to 1 mm is preferable.

<Optical Material>

Examples of the optical substrate on which the cured body obtained by curing the curable composition for an optical material of the present invention is laminated include a plastic lens substrate, but other optical substrates can also be used. The plastic lens substrate is not particularly limited, and a known substrate can be used. Examples thereof include thermoplastic resin lenses such as (meth)acrylic resins and polycarbonate resins, and crosslinkable resin lenses such as polyfunctional (meth)acrylic resins, allyl resins, thiourethane resins, urethane resins, and thioepoxy resins. In addition, the present invention can also be applied to a plastic lens substrate in which a hard coat layer or the like is laminated on the plastic lens substrate.

The thickness of the optical substrate is not particularly limited, and for example, in the case of a plastic lens substrate, it is preferably in the range of 0.5 to 10 mm. In the case of a plastic lens substrate, the curable composition for an optical material of the present invention can be suitably applied when all of the thicknesses of the end portion and the central portion are in the range of 0.5 to 10 mm and the ratio of the thicknesses of the central portion and the end portion (central portion/end portion) is 0.1 to 10. In the case of a plastic lens substrate, it is also possible to form a primer layer or the like on a substrate thicker than the above-mentioned range and finally polish it to the above-mentioned thickness range.

In the plastic lens substrate, since the thickness of the central portion and the thickness of the end portion are usually different from each other, the ultraviolet absorbing ability is different due to the difference in thickness. Therefore, when the ultraviolet absorber is blended only in the plastic lens substrate, the ultraviolet absorbing ability of the central portion differs from that of the end portion. According to the present invention, this problem can be solved. However, as the plastic lens substrate, a plastic lens substrate blended with an ultraviolet absorber can also be used.

The optical substrate may be subjected to a chemical treatment with an alkali solution, an acid solution or the like, or a physical treatment with corona discharge, plasma discharge, polishing or the like, to improve the adhesion between the cured body and the optical substrate.

In addition, in the optical material of the present invention, another layer may be laminated between the optical substrate and the cured body as long as the effects of the present invention are not impaired. For example, before the curable composition for an optical material is applied onto the surface of an optical substrate by a coating method to form a cured body, a primer such as a polyurethane-based primer, a polyester-based primer, a polyvinyl acetal-based primer, or an epoxy-based primer may be applied onto the surface of the optical substrate and cured. Among them, the curable composition for an optical material of the present invention can be particularly suitably applied to the case where an optical substrate having a primer layer as an adhesive layer is used in order to enhance adhesion between an optical substrate such as a plastic lens substrate and a cured body.

As the primer layer, a known polyurethane resin can be used. Among them, from the viewpoint of adhesion, a primer layer composed of a moisture-curable polyurethane resin or a precursor thereof as described in Japanese Patent No. 4405833 or a water-dispersed urethane emulsion as described in Japanese Patent Nos. 5016266 and 5084727 is preferable.

Since the optical material in which the cured body obtained by curing the curable composition for an optical material of the present invention is laminated on the optical substrate is used particularly for plastic lenses, the optical material preferably has a light transmittance of 5% or less at a wavelength of 400 nm and a light transmittance of 70% or less at a wavelength of 420 nm.

<Secondary Processing of Cured Body; Lamination of Other Layers (Hard Coat Layer)>

The cured body produced by the above-described method and an optical material such as a plastic lens on which the obtained cured body is laminated can be used as they are, but may be used after being coated with a hard coat layer. The hard coat layer preferably contains inorganic particles, particularly inorganic oxide particles. Further, the hard coat layer is preferably a layer obtained by curing a hard coat composition containing inorganic particles and a hydrolyzable group-containing organosilicon compound.

As the inorganic particles used in the hard coat composition, silica sol, inorganic oxide or composite inorganic oxide fine particles can be used without any limitation. The blending amount of the inorganic particles may be appropriately determined depending on the type of the inorganic oxide, the physical properties desired for the hard coat layer to be finally obtained, and the purpose. In general, the amount of the inorganic oxide fine particles may be set in accordance with the amount of other components to be used so that the ratio of the inorganic oxide fine particles in the finally formed hard coat layer is 20 to 80% by mass, particularly 40 to 60% by mass.

The hydrolyzable group-containing organosilicon compound functions as a binder for the inorganic oxide particles and forms a transparent cured body serving as a matrix in the hard coat layer, and a polymerizable organosilicon compound is used. The organosilicon compound has an alkoxysilyl group as a functional group, and the known hydrolyzable group-containing organosilicon compound described above can be used without any limitation. These organosilicon compounds may be used alone or in combination of two or more. The organosilicon compound can also be used in the form of at least a partial hydrolyzate or in the form of a partial condensate obtained by condensation of a partial hydrolyzate thereof. In the present invention, γ-glycidoxypropyltrimethoxysilane, γ-glycidoxypropylmethyldimethoxysilane, tetraethoxysilane, and partial hydrolyzates or partial condensates thereof are preferably used particularly from the viewpoint of adhesion to plastic lenses and crosslinking properties.

In this hard coat composition, it is considered that the hydrolyzable group-containing organosilicon compound is hydrolyzed, and this hydrolyzate is polymerized and cured (polycondensed) in the form of incorporating the inorganic oxide fine particles to form a cured body serving as a matrix, thereby forming a hard coat layer in which the inorganic oxide fine particles are densely dispersed in the matrix.

Therefore, in order to form the cured body, water is required to promote the hydrolysis of the hydrolyzable group-containing organosilicon compound.

Water used for this purpose may be added in the form of an aqueous acid solution, and for example, an inorganic acid such as hydrochloric acid, sulfuric acid, nitric acid or phosphoric acid, or an organic acid such as acetic acid or propionic acid can be added in the form of an aqueous solution.

The hard coat composition may contain a curing catalyst for accelerating the curing of the hydrolyzate of the hydrolyzable group-containing organosilicon compound. As the curing catalyst, those known per se, for example, acetylacetonate complexes, perchlorates, organic metal salts, and various Lewis acids can be used, and these can be used alone or in combination of two or more.

Specific examples of the acetylacetonate complex include aluminum acetylacetonate.

Specific examples of the perchlorate include magnesium perchlorate, aluminum perchlorate, zinc perchlorate, and ammonium perchlorate.

In addition, the hard coat composition may also contain an organic solvent. This organic solvent serves as a solvent for the hydrolyzable group-containing organosilicon compound and also serves as a dispersion medium for the inorganic oxide fine particles, and any known organic solvent can be used as long as it has such a function as well as volatility. Specific examples of such organic solvents include alcohols such as methanol, ethanol, propanol, isopropanol, butanol, and diacetone alcohol; lower alcohol esters of lower carboxylic acids such as methyl acetate, ethyl acetate, and propyl acetate; ethers such as cellosolve, dioxane, and ethylene glycol monoisopropyl ether; ketones such as acetone, methyl ethyl ketone, methyl isobutyl ketone, and acetylacetone; halogenated hydrocarbons such as methylene chloride; and aromatic hydrocarbons such as benzene, toluene, and xylene. These organic solvents may be used alone or in combination of two or more.

The hard coat composition for forming the hard coat layer can be produced by mixing the above components by a known method. In particular, the hydrolyzable group-containing organosilicon compound is preferably mixed with other components after being completely hydrolyzed. The thickness of the hard coat layer is preferably 1 to 4 μm. In this manner, a hard coat layer can be formed.

In the prior art, the hard coat layer is blended with an ultraviolet absorber to exhibit ultraviolet absorbing ability. However, as described above, it is considered that the main component of the hard coat layer is formed of the inorganic particles and the hydrolyzable organosilicon compound, and the ultraviolet absorber is easily bled. According to the present invention, such a problem can also be solved. However, in the present invention, a hard coat layer containing an appropriate amount of an ultraviolet absorber may be formed.

<Other Layers>

If necessary, the optical material having the hard coat layer laminated thereon may be subjected to post-processing such as thin film formation by vapor deposition of metallic oxides such as $SiO_2$, $TiO_2$, and $ZrO_2$ on the hard coat layer, antireflection treatment by a thin film formed by coating an organic polymer, and antistatic treatment.

EXAMPLES

Hereinafter, the present invention will be specifically described with reference to Examples, but the present invention is not limited to these Examples. The evaluation methods used in the Examples of the present invention are as follows.

[Method for Measuring Maximum Absorption Wavelength or Largest Absorption Wavelength]

As a measuring instrument, Shimadzu Spectrophotometer UV-2550 manufactured by Shimadzu Corporation was used. The measurement was carried out by preparing a solution (component (B) and component (C): concentration $1.0 \times 10^{-4}$ mol/L, component (E): concentration $3.0 \times 10^{-3}$ mg/mL) obtained by dissolving the measurement object in a solvent (chloroform), and using a quartz cell with an optical path length of 10 mm.

[Method for Measuring Light Transmittance]

As a measuring instrument, a Shimadzu Spectrophotometer UV-2550 manufactured by Shimadzu Corporation was used to measure an ultraviolet-visible light spectrum of an optical material obtained by laminating an optical substrate (lens substrate) and a cured body.

[Measurement of YI Value]

As a measuring instrument, an SM color meter SM-T45 manufactured by Suga Test Instruments Co., Ltd. was used for measurement. An optical material obtained by laminating an optical substrate and a cured body was used as a measurement sample.

[Weather Resistance Test]

Using a Xenon weather meter X25 manufactured by Suga Test Instruments Co., Ltd., the change in absorbance at 435 nm between the initial stage (before use of the weather meter) and after using for 96 hours was evaluated as a residual rate (%). An optical material obtained by laminating an optical substrate and a cured body was used as a measurement sample.

Residual rate (%)=(initial absorbance)/(absorbance after using a weather meter for 96 hours)×100

Abbreviations and names of the compounds used in the Examples are shown below.

Component (A): Radical Polymerizable Monomer

Component (A1-1):
- ADE-400: polyethylene glycol diacrylate (in the formula (2), a=9, b=0, average molecular weight 508).
- 14G: polyethylene glycol dimethacrylate (in the formula (2), a=14, b=0, average molecular weight 736).

Component (A1-2):
- A-BPE-10: 2,2-bis[4-(acryloyloxypolyethoxy)phenyl]propane (in the formula (3), (c+d)=10, average molecular weight 776).
- KT50: 2,2-bis[4-(methacryloyloxypolyethoxy)phenyl]propane (in the formula (3), (c+d)=10, average molecular weight 804).

Component (A1-3):
- A-PC: ester compound of polycarbonate diol (average molecular weight 500) obtained by phosgenation of pentamethylene glycol and hexamethylene glycol and acrylic acid.

Component (A2-1):
- TMPT: trimethylolpropane trimethacrylate.

Component (A3):
- GMA: glycidyl methacrylate
- TSL: γ-methacryloyloxypropyltrimethoxysilane Component (B): Benzotriazole-Based Ultraviolet Absorber Having a Maximum Absorption Wavelength of 360 nm or More and Less than 380 nm
- UVA-1: 6-(5-heptylcarbonyloxyethyl-2H-benzotriazol-2-yl)benzo[1,3] dioxol-5-ol (maximum absorption wavelength: 367 nm, absorption coefficient: 50 (L/(g·cm)), SP value: 13.0 $(cal/cm^3)^{1/2}$)

UVA-2: 6-(5-chloro-2H-benzotriazol-2-yl)benzo[1,3]dioxol-5-ol (maximum absorption wavelength: 375 nm, absorption coefficient: 60 (L/(g·cm)), SP value: 16.0 $(cal/cm^3)^{1/2}$)

Component (C): Ultraviolet Absorber Having a Maximum Absorption Wavelength of Less than 360 nm UVA-10: 2,4-dihydroxybenzophenone (maximum absorption wavelength: 325 nm, absorption coefficient: 35 (L/(g·cm)); largest absorption wavelength: 283 nm, absorption coefficient: 62 (L/(g·cm)), SP value: 14.5 $(cal/cm^3)^{1/2}$)

UVA-11: 2-hydroxy-4-methoxybenzophenone (maximum absorption wavelength: 325 nm, absorption coefficient: 43 (L/(g·cm)); largest absorption wavelength: 288 nm, absorption coefficient: 67 (L/(g·cm)), SP value: 12.7 $(cal/cm^3)^{1/2}$)

UVA-12: 2-(3-tert-butyl-2-hydroxy-5-methylphenyl)-5-chloro-2H-benzotriazole (maximum absorption wavelength: 352 nm, absorption coefficient 50 (L/(g·cm)), SP value: 12.6 $(cal/cm^3)^{1/2}$)

(D) Radical Polymerization Initiator

PI: phenylbis(2,4,6-trimethylbenzoyl)phosphine oxide (E) Light-Absorbing Compound Having a Maximum Absorption Wavelength in a Range of 400 nm or More and 450 nm or Less FDB-001: a porphyrin compound manufactured by Yamada Chemical Co., Ltd. (maximum absorption wavelength: 420 nm, absorption coefficient: 510 (L/(g·cm)), half-value width: 18 nm)

FDB-002: a porphyrin compound manufactured by Yamada Chemical Co., Ltd. (maximum absorption wavelength: 431 nm, absorption coefficient: 380 (L/(g·cm)), half-value width: 18 nm)

(F) Dye Having a Maximum Absorption Wavelength in a Range of 540 nm or More and 650 nm or Less Component (F1):

Blue J: "Diaresin Blue J" manufactured by Mitsubishi Chemical Corporation (maximum absorption wavelength: 590 nm, absorption coefficient: 35 (L/(g·cm)), half-value width: 110 nm)

Component (F2):

FDG-006: a tetraazaporphyrin compound manufactured by Yamada Chemical Co., Ltd. (maximum absorption wavelength: 584 nm, absorption coefficient: 80 (L/(g·cm)), half-value width: 25 nm)

FDG-007: a tetraazaporphyrin compound manufactured by Yamada Chemical Co., Ltd. (maximum absorption wavelength: 591 nm, absorption coefficient: 145 (L/(g·cm)), half-value width: 19 nm)

(Other Additives)
(Leveling Agent)

L7001: polyether-modified silicone manufactured by Dow Corning Toray Co., Ltd.

Example 1

To 100 parts by mass of a polymerizable monomer mixture (I) (SP value: 9.7 $(cal/cm^3)^{1/2}$) composed of: (A1-1) 17 parts by mass of ADE-400 and 6 parts by mass of 14G; (A1-2) 5 parts by mass of A-BPE-10 and 38 parts by mass of KT50; (A2-1) 28 parts by mass of TMPT; and (A3) 1 part by mass of GMA and 5 parts by mass of TSL, 1.7 (B) parts by mass of 6-(5-heptylcarbonyloxyethyl-2H-benzotriazol-2-yl)benzo[1,3]dioxol-5-ol (UVA-1), (C) 2.8 parts by mass of 2,4-dihydroxybenzophenone (UVA-10), (D) 0.25 parts by mass of phenylbis(2,4.6-trimethylbenzoyl)phosphine oxide (PI) as a polymerization initiator, and 0.1 parts by mass of L7001 as a leveling agent were added and sufficiently mixed to prepare a curable composition for an optical material. Table 1 summarizes the proportions of each component.

Next, the curable composition as a mixed liquid was coated on an optical substrate and cured to obtain an optical material in which an optical substrate and a cured body were laminated. This will be described in detail below.

First, MR-8 (thiourethane resin plastic lens; refractive index=1.60) having a center thickness of 2.0 mm was prepared as an optical substrate. The optical substrate was sufficiently degreased with acetone, subjected to alkali etching using a 10% sodium hydroxide solution at 50° ° C. for 5 minutes, and then sufficiently washed with distilled water.

Using a spin coater (1H-DX2, manufactured by MIKASA Co., Ltd.), a moisture-curable primer (product name: TR-SC-P, manufactured by Tokuyama Corporation) was coated on the surface of the optical substrate at a rotation speed of 70 rpm for 15 seconds, and then at 1000 rpm for 10 seconds. Thereafter, about 2 g of the curable composition for an optical material obtained above was spin-coated at a rotation speed of 60 rpm for 40 seconds, and then 700 rpm for 10 to 20 seconds so as to be 40 μm thick.

The optical substrate on which the curable composition for an optical material was applied was irradiated with light for 40 seconds using a metal halide lamp with an output of 10 J/cm² in a nitrogen-gas atmosphere to be cured. Thereafter, the mixture was further heated at 110° C. for 1 hour to produce an optical material in which an optical substrate and a cured body were laminated. The evaluation results of the obtained optical material are shown in Table 2.

Example 2

A curable composition for an optical material was obtained in the same manner as in Example 1 except that 0.01 parts by mass of (F1) Blue J was added as the component (F). An optical material in which an optical substrate and a cured body were laminated was produced in the same manner as in Example 1 except for the above, and was evaluated. The evaluation results of the obtained optical material are shown in Table 2.

Example 3

A curable composition for an optical material was obtained in the same manner as in Example 1, except that 0.006 parts by mass of (E) FDB-002 and 0.028 parts by mass of (F1) Blue J were added as the component (E) and the component (F), respectively. An optical material in which an optical substrate and a cured body were laminated was produced in the same manner as in Example 1 except for the above, and was evaluated. The evaluation results of the obtained optical material are shown in Table 2.

Example 4

A curable composition for an optical material was obtained in the same manner as in Example 1, except that 0.006 parts by mass of (E) FDB-002 and 0.085 parts by mass of (F2) FDG-007 were added as the component (E) and the component (F), respectively. An optical material in which an optical substrate and a cured body were laminated was produced in the same manner as in Example 1 except for the above, and was evaluated. The evaluation results of the obtained optical material are shown in Table 2.

Example 5

To 100 parts by mass of the polymerizable monomer mixture (I), 2.8 parts by mass of (B) 6-(5-heptylcarbonyloxyethyl-2H-benzotriazol-2-yl)benzo[1,3]dioxol-5-ol, 2.8 parts by mass of (C) 2,4-dihydroxybenzophenone, 0.3 parts by mass of (D) phenylbis(2,4,6-trimethylbenzoyl)phosphine oxide as a polymerization initiator, 0.016 parts by mass of (F1) Blue J as a bluing agent, and 0.1 parts by mass of L7001 as a leveling agent were added and sufficiently mixed to prepare a curable composition for an optical material. Table 1 summarizes the proportions of each component. Thereafter, an optical material in which an optical substrate and a cured body were laminated was produced in the same manner as in Example 1, except that CR-39 (allyl resin plastic lens; refraction index=1.50) having a thickness of 2.0 mm was used as the optical substrate, and evaluation was performed. The evaluation results of the obtained optical material are shown in Table 2.

Example 6

A curable composition for an optical material was obtained in the same manner as in Example 5, except that 0.006 parts by mass of (E) FDB-002 was added as the component (E) and the amount of (F1) Blue J added was changed to 0.035 parts by mass. An optical material in which an optical substrate and a cured body were laminated was produced in the same manner as in Example 5 except for the above, and was evaluated. The evaluation results of the obtained optical material are shown in Table 2.

Example 7

A curable composition for an optical material was obtained in the same manner as in Example 5, except that 0.006 parts by mass of (E) FDB-002 was added as the component (E) and 0.085 parts by mass of (F2) FDG-007 was added instead of (F1) Blue J as the component (F). An optical material in which an optical substrate and a cured body were laminated was produced in the same manner as in Example 5 except for the above, and was evaluated. The evaluation results of the obtained optical material are shown in Table 2.

Example 8

To 100 parts by mass of the polymerizable monomer mixture (I), 3.3 parts by mass of (B) 6-(5-heptylcarbonyloxyethyl-2H-benzotriazol-2-yl)benzo[1,3]dioxol-5-ol, 2.8 parts by mass of (C) 2,4-dihydroxybenzophenone, 0.3 parts by mass of (D) phenylbis(2,4,6-trimethylbenzoyl)phosphine oxide as a polymerization initiator, 0.03 parts by mass of FDB-001 as the component (E), 0.15 parts by mass of FDG-006 as the component (F2), and 0.1 parts by mass of L7001 as a leveling agent were added and sufficiently mixed to prepare a curable composition for an optical material. Table 1 summarizes the proportions of each component. An optical material in which an optical substrate and a cured body were laminated was produced in the same manner as in Example 1 except for the above, and was evaluated. The evaluation results of the obtained optical material are shown in Table 2.

Example 9

To 100 parts by mass of the polymerizable monomer mixture (I), 1.7 parts by mass of (B) 6-(5-heptylcarbonyloxyethyl-2H-benzotriazol-2-yl)benzo[1,3]dioxol-5-ol, 3.0 parts by mass of (C) 2-hydroxy-4-methoxybenzophenone, 0.25 parts by mass of (D) phenylbis(2,4,6-trimethylbenzoyl) phosphine oxide as a polymerization initiator, 0.006 parts by mass of FDB-002 as the component (E), 0.028 parts by mass of Blue J as the component (F1), and 0.1 parts by mass of L7001 as a leveling agent were added and sufficiently mixed to prepare a curable composition for an optical material. Table 1 summarizes the proportions of each component. An optical material in which an optical substrate and a cured body were laminated was produced in the same manner as in Example 1 except for the above, and was evaluated. The evaluation results of the obtained optical material are shown in Table 2.

Example 10

To 100 parts by mass of a polymerizable monomer mixture (II) (SP value: 9.7 $(cal/cm^3)^{1/2}$) composed of: (A1-1) 44 parts by mass of 14G; (A1-3) 10 parts by mass of A-PC; (A2-1) 39 parts by mass of TMPT; and (A3) 1 part by mass of GMA and 6 parts by mass of TSL, (B) 1.7 parts by mass of 6-(5-heptylcarbonyloxyethyl-2H-benzotriazol-2-yl)benzo[1,3]dioxol-5-ol, (C) 2.8 parts by mass of 2,4-dihydroxybenzophenone, (D) 0.25 parts by mass of phenylbis(2,4.6-trimethylbenzoyl)phosphine oxide as a polymerization initiator, 0.01 parts by mass of (F1) Blue J as a bluing agent, and 0.1 parts by mass of L7001 as a leveling agent were added and sufficiently mixed to prepare a curable composition for an optical material. Table 1 summarizes the proportions of each component. Thereafter, in the same manner as in Example 1, an optical material in which an optical substrate and a cured body were laminated was produced, and was evaluated. The evaluation results of the obtained optical material are shown in Table 2.

Example 11

A cured body composition was produced in the same manner as in Example 10, except that 0.006 parts by mass of FDB-002 was added as the component (E). Table 1 summarizes the proportions of each component. Thereafter, in the same manner as in Example 1, an optical material in which an optical substrate and a cured body were laminated was produced, and was evaluated. The evaluation results of the obtained optical material are shown in Table 2.

Comparative Example 1

A curable composition for an optical material was obtained in the same manner as in Example 1, except that 0.4 parts by mass of 6-(5-chloro-2H-benzotriazol-2-yl)benzo[1,3]dioxol-5-ol (UVA-2) was used instead of the component (B) (UVA-1) used in Example 1 and 0.01 parts by mass of (F1) Blue J was added. The obtained curable composition for an optical material had low stability, and the component (B) was precipitated within 24 hours after preparation. From the viewpoint of stability, it was determined that the benzotriazole was not useful. However, before precipitation occurred, an optical material in which an optical substrate and a cured body were laminated was produced in the same manner as in Example 1, and was evaluated.

Comparative Example 2

A curable composition for an optical material was obtained in the same manner as in Example 1, except that 1.7 parts by mass of 2-(3-tert-butyl-2-hydroxy-5-methylphenyl)-5-chloro-2H-benzotriazole (UVA-12) was used instead of the component (B) (UVA-1) used in Example 1, the amount of UVA-10 was changed to 3.0 parts by mass, and 0.01 parts by mass of (F1) Blue J was added. In the same manner as in Example 1, an optical material in which an optical substrate and a cured body were laminated was produced, and was evaluated. The evaluation results of the obtained optical material are shown in Table 2. The light transmittance at 420 nm was 83%, indicating that the blue light cutting ability was insufficient.

Comparative Example 3

A curable composition for an optical material was obtained in the same manner as in Example 1, except that 5.5 parts by mass of 2-(3-tert-butyl-2-hydroxy-5-methylphenyl)-5-chloro-2H-benzotriazole (UVA-12) was used instead of the component (B) (UVA-1) used in Example 1, the amount of UVA-10 was changed to 3.0 parts by mass, and 0.01 parts by mass of (F1) Blue J was added. The obtained curable composition for an optical material had low stability, and UVA-12 was precipitated within 24 hours after preparation. From the viewpoint of stability, it was determined that the benzotriazole was not useful. However, before precipitation occurred, an optical material in which an optical substrate and a cured body were laminated was produced in the same manner as in Example 1, and was evaluated. The evaluation results of the obtained optical material are shown in Table 2. The light transmittance at 420 nm was 76%, and it was found that even when a large amount of an ultraviolet absorber having a maximum absorption wavelength outside the range of 360 to 380 nm was added, the blue light cutting ability was insufficient.

Comparative Example 4

To 100 parts by mass of the polymerizable monomer mixture (I), 1.7 parts by mass of (B) 6-(5-heptylcarbonyloxyethyl-2H-benzotriazol-2-yl)benzo[1,3]dioxol-5-ol (UVA-1), 0.25 parts by mass of (D) phenylbis(2,4,6-trimethylbenzoyl)phosphine oxide as a polymerization initiator, 0.006 parts by mass of FDB-002 as the component (E), 0.028 parts by mass of Blue J as the component (F1), and 0.1 parts by mass of L7001 as a leveling agent were added and sufficiently mixed to prepare a curable composition for an optical material. Table 1 summarizes the proportions of each component. Thereafter, in the same manner as in Example 1, an optical material in which an optical substrate and a cured body were laminated was produced, and was evaluated. The evaluation results of the obtained optical material are shown in Table 2. The 96-hour residual rate in the weather resistance evaluation was 25%, which was significantly lower than the residual rate in Example 3 (80%) and the residual rate in Example 9 (78%), which were obtained under the condition of adding an ultraviolet absorber having a maximum absorption wavelength of less than 360 nm.

Comparative Example 5

To 100 parts by mass of the polymerizable monomer mixture (II), 1.7 parts by mass of (B) 6-(5-heptylcarbonyloxyethyl-2H-benzotriazol-2-yl)benzo[1,3]dioxol-5-ol (UVA-1), 0.25 parts by mass of (D) phenylbis(2,4,6-trimethylbenzoyl)phosphine oxide as a polymerization initiator, 0.006 parts by mass of FDB-002 as the component (E), 0.028 parts by mass of Blue J as the component (F1), and 0.1 parts by mass of L7001 as a leveling agent were added and sufficiently mixed to prepare a curable composition for an optical material. Table 1 summarizes the proportions of each component. Thereafter, in the same manner as in Example 1, an optical material in which an optical substrate and a cured body were laminated was produced, and was evaluated. The evaluation results of the obtained optical material are shown in Table 2. The 96-hour residual rate in the weather resistance evaluation was 21%, which was significantly lower than the residual rate in Example 11 (76%), which was obtained under the condition of adding an ultraviolet absorber having a maximum absorption wavelength of less than 360 nm.

From the results of the above Examples and Comparative Examples, the following can be seen.

In each of Examples 1 to 11, ultraviolet rays and blue light harmful to the eye can be cut. In particular, in Examples 3, 4, 6, 7, 8, 9, and 11 in which the component (E) was added, it also had the ability to cut blue light at 435 nm, and was effective in suppressing blue light hazard.

Further, in Comparative Examples, in the case of the ultraviolet absorber (B) such as UVA-2 having a large difference in SP value from the component (A), when the ultraviolet absorber is dissolved in the component (A) at a concentration capable of securing the ability to cut ultraviolet rays and blue light as a cured body, the ultraviolet absorber is precipitated from the curable composition for an optical material immediately after preparation, and thus the practicality is poor. In addition, when an ultraviolet absorber having a maximum absorption wavelength outside the range of the present invention is used instead of the component (B), the ability to cut ultraviolet rays and blue light is insufficient, and it is difficult to form a cured body having sufficient ability to cut ultraviolet rays and blue light from the viewpoint of solubility. Moreover, when the ultraviolet absorber (C) having a maximum absorption wavelength of less than 360 nm is not added, the weather resistance becomes very poor, and thus it is considered that the durability of the ability to cut ultraviolet rays and blue light is low.

TABLE 1

| | (A) (part by mass) | (B) (part by mass) | (C) (part by mass) | (D) (part by mass) | (E) (part by mass) | (F) (F1) (part by mass) | (F) (F2) (part by mass) | (Additive) (part by mass) | Remarks |
|---|---|---|---|---|---|---|---|---|---|
| Example 1 | Polymerizable monomer mixture (I) (100) (SP value: 9.7 (cal/cm³)$^{1/2}$) | UVA-1 (1.7) (SP value: 13.0) | UVA-10 (2.8) (SP value: 14.5) | PI (0.25) | — | — | — | L7001 (0.1) | |
| Example 2 | Polymerizable monomer mixture (I) (100) (SP value: 9.7 (cal/cm³)$^{1/2}$) | UVA-1 (1.7) (SP value: 13.0) | UVA-10 (2.8) (SP value: 14.5) | PI (0.25) | — | Blue J (0.01) | — | L7001 (0.1) | |
| Example 3 | Polymerizable monomer mixture (I) (100) (SP value: 9.7 (cal/cm³)$^{1/2}$) | UVA-1 (1.7) (SP value: 13.0) | UVA-10 (2.8) (SP value: 14.5) | PI (0.25) | FDB-002 (0.006) | Blue J (0.028) | — | L7001 (0.1) | |
| Example 4 | Polymerizable monomer mixture (I) (100) (SP value: 9.7 (cal/cm³)$^{1/2}$) | UVA-1 (1.7) (SP value: 13.0) | UVA-10 (2.8) (SP value: 14.5) | PI (0.25) | FDB-002 (0.006) | — | FDG-007 (0.085) | L7001 (0.1) | |
| Example 5 | Polymerizable monomer mixture (I) (100) (SP value: 9.7 (cal/cm³)$^{1/2}$) | UVA-1 (2.8) (SP value: 13.0) | UVA-10 (2.8) (SP value: 14.5) | PI (0.3) | — | Blue J (0.016) | — | L7001 (0.1) | |
| Example 6 | Polymerizable monomer mixture (I) (100) (SP value: 9.7 (cal/cm³)$^{1/2}$) | UVA-1 (2.8) (SP value: 13.0) | UVA-10 (2.8) (SP value: 14.5) | PI (0.3) | FDB-002 (0.006) | Blue J (0.035) | — | L7001 (0.1) | |
| Example 7 | Polymerizable monomer mixture (I) (100) (SP value: 9.7 (cal/cm³)$^{1/2}$) | UVA-1 (2.8) (SP value: 13.0) | UVA-10 (2.8) (SP value: 14.5) | PI (0.3) | FDB-002 (0.006) | — | FDG-007 (0.085) | L7001 0.1) | |
| Example 8 | Polymerizable monomer mixture (I) (100) (SP value: 9.7 (cal/cm³)$^{1/2}$) | UVA-1 (2.8) (SP value: 13.0) | UVA-10 (2.8) (SP value: 14.5) | PI (0.3) | FDB-001 (0.03) | — | FDG-006 (0.15) | L7001 (0.1) | |
| Example 9 | Polymerizable monomer mixture (I) (100) (SP value: 9.7 (cal/cm³)$^{1/2}$) | UVA-1 (1.7) (SP value: 13.0) | UVA-11 (3.0) (SP value: 12.7) | PI (0.25) | FDB-002 (0.006) | Blue J (0.028) | — | L7001 (0.1) | |
| Example 10 | Polymerizable monomer mixture (II) (100) (SP value: 9.7 (cal/cm³)$^{1/2}$) | UVA-1 (1.7) (SP value: 13.0) | UVA-10 (2.8) (SP value: 14.5) | PI (0.25) | — | Blue J (0.01) | — | L7001 (0.1) | |
| Example 11 | Polymerizable monomer mixture (II) (100) (SP value: 9.7 (cal/cm³)$^{1/2}$) | UVA-1 (1.7) (SP value: 13.0) | UVA-10 (2.8) (SP value: 14.5) | PI (0.25) | FDB-002 (0.006) | Blue J (0.028) | — | L7001 (0.1) | |
| Comparative Example 1 | Polymerizable monomer mixture (I) (100) (SP value: 9.7 (cal/cm³)$^{1/2}$) | UVA-2 (0.4) (SP value: 16.0) | UVA-10 (2.8) (SP value: 14.5) | PI (0.25) | — | Blue J (0.01) | — | L7001 (0.1) | UVA-2 precipitation |
| Comparative Example 2 | Polymerizable monomer mixture (I) (100) (SP value: 9.7 (cal/cm³)$^{1/2}$) | — | UVA-12 (1.7) (SP value: 12.6) UVA-10 (3.0) (SP value: 14.5) | PI (0.25) | — | Blue J (0.01) | — | L7001 (0.1) | |
| Comparative Example 3 | Polymerizable monomer mixture (I) (100) (SP value: 9.7 (cal/cm³)$^{1/2}$) | — | UVA-12 (5.5) (SP value: 12.6) UVA-10 (3.0) (SP value: 14.5) | PI (0.25) | — | Blue J (0.01) | — | L7001 (0.1) | UVA-12 precipitation |
| Comparative Example 4 | Polymerizable monomer mixture (I) (100) (SP value: 9.7 (cal/cm³)$^{1/2}$) | UVA-1 (1.7) (SP value: 13.0) | — | PI (0.25) | FDB-002 (0.006) | Blue J (0.028) | — | L7001 (0.1) | |
| Comparative Example 5 | Polymerizable monomer mixture (II) (100) (SP value: 9.7 (cal/cm³)$^{1/2}$) | UVA-1 (1.7) (SP value: 13.0) | — | PI (0.25) | FDB-002 (0.006) | Blue J (0.028) | — | L7001 (0.1) | |

TABLE 2

| | Optical substrate | Transmittance (%) 400 nm | Transmittance (%) 420 nm | Transmittance (%) 435 nm | YI | Weather resistance, residual rate (%) |
|---|---|---|---|---|---|---|
| Example 1 | MR8 | 0.2 | 57 | 87 | 6.6 | — |
| Example 2 | MR8 | 0.2 | 56 | 86 | 4.9 | — |
| Example 3 | MR8 | 0.3 | 56 | 69 | 4.1 | 80 |
| Example 4 | MR8 | 0.1 | 58 | 68 | −19.3 | — |
| Example 5 | CR39 | 0.2 | 46 | 87 | — | — |
| Example 6 | CR39 | 0.1 | 47 | 68 | — | — |
| Example 7 | CR39 | 0.1 | 46 | 67 | — | — |
| Example 8 | MR8 | 0.0 | 16 | 71 | — | — |
| Example 9 | MR8 | 0.2 | 57 | 70 | — | 78 |
| Example 10 | MR8 | 0.1 | 57 | 87 | — | — |
| Example 11 | MR8 | 0.2 | 56 | 68 | — | 76 |
| Comparative Example 1 | MR8 | 3.0 | 60 | 85 | — | — |
| Comparative Example 2 | MR8 | 4.0 | 83 | 88 | — | — |
| Comparative Example 3 | MR8 | 1.4 | 76 | 87 | — | — |
| Comparative Example 4 | MR8 | 0.3 | 57 | 68 | — | 25 |
| Comparative Example 5 | MR8 | 0.2 | 56 | 69 | — | 21 |

The invention claimed is:

1. A photo curable composition for an optical material, comprising:
   (A) 100 parts by mass of a radical polymerizable monomer;
   (B) 0.1 to 5 parts by mass of a benzotriazole-based ultraviolet absorber represented by the following formula (1), which has a maximum absorption wavelength of 360 nm or more and less than 380 nm and an absolute value of the difference in solubility parameter (SP value) from the radical polymerizable monomer (A) of 5.5 $(cal/cm^3)^{1/2}$ or less;
   (C) 1 to 5 parts by mass of an ultraviolet absorber which is at least one selected from a benzotriazole compound, a benzophenone compound and a triazine compound and has a maximum absorption wavelength of less than 360 nm; and
   (D) 0.05 to 0.5 parts by mass of a radical polymerization initiator:

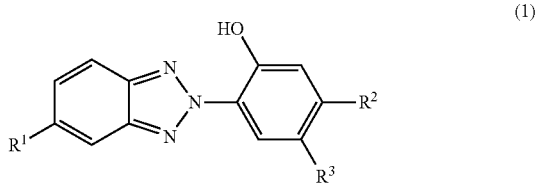

wherein $R^1$ represents a hydrogen atom, an alkyl group having 1 to 8 carbon atoms, an alkoxy group having 1 to 8 carbon atoms, a hydroxy group, a linear or branched monosubstituted amino group having 1 to 4 carbon atoms, a linear or branched disubstituted amino group having 1 to 4 carbon atoms, a nitro group, a carboxy group, an alkyloxycarbonyl group having 1 to 8 carbon atoms in the alkyl group, a hydroxyalkyl group having 1 to 8 carbon atoms, an alkylcarbonyloxyalkyl group having 1 to 8 carbon atoms in each alkyl group, a carboxyalkyl group having 1 to 3 carbon atoms in the alkyl group, an alkyloxycarbonylalkyl group in which the total number of carbon atoms in the alkyl group is 2 to 10, an aryl group, an acyl group, a sulfo group, or a cyano group; $R^2$ represents a hydroxy group, an alkoxy group having 1 to 8 carbon atoms, an alkylthio group having 1 to 8 carbon atoms, a linear or branched monosubstituted amino group having 1 to 4 carbon atoms, or a linear or branched disubstituted amino group having 1 to 4 carbon atoms; and $R^3$ represents a hydrogen atom, a hydroxy group, an alkyl or alkoxy group having 1 to 8 carbon atoms, a linear or branched monosubstituted amino group having 1 to 4 carbon atoms, or a linear or branched disubstituted amino group having 1 to 4 carbon atoms, and may be a cyclic structure in which $R^2$ and $R^3$ are crosslinked.

2. The photo curable composition for an optical material according to claim 1, wherein the radical polymerizable monomer (A) is a (meth)acrylic polymerizable compound.

3. The photo curable composition for an optical material according to claim 1, wherein the radical polymerization initiator (D) is a photopolymerization initiator.

4. The photo curable composition for an optical material according to claim 3, wherein the ratio of the sum of the masses of the ultraviolet absorbers (B) and (C) to the mass of the photopolymerization initiator is 6:1 or more and 30:1 or less.

5. The photo curable composition for an optical material according to claim 1, further comprising (E) a light-absorbing compound having a maximum absorption wavelength in a range of 400 nm or more and 450 nm or less.

6. The photo curable composition for an optical material according to claim 5, wherein the light-absorbing compound (E) is a porphyrin compound.

7. The photo curable composition for an optical material according to claim 1, further comprising (F) a dye having a maximum absorption wavelength in a range of 540 nm or more and 650 nm or less.

8. A cured body obtained by curing the photo curable composition for an optical material according to claim 1.

9. An optical material obtained by laminating an optical substrate and the cured body according to claim 8.

10. The optical material according to claim 9, wherein the cured body has a thickness of 5 to 70 μm.

11. The optical material according to claim 9, wherein the optical material has a light transmittance of 5% or less at a wavelength of 400 nm and a light transmittance of 70% or less at a wavelength of 420 nm.

12. The photo curable composition for an optical material according to claim 1, wherein $R^1$ represents an alkyl group having 1 to 8 carbon atoms, an alkoxy group having 1 to 8 carbon atoms, a hydroxy group, a linear or branched monosubstituted amino group having 1 to 4 carbon atoms, a linear or branched disubstituted amino group having 1 to 4 carbon atoms, a nitro group, a carboxy group, an alkyloxycarbonyl group having 1 to 8 carbon atoms in the alkyl group, a hydroxyalkyl group having 1 to 8 carbon atoms, an alkylcarbonyloxyalkyl group having 1 to 8 carbon atoms in each alkyl group, a carboxyalkyl group having 1 to 3 carbon atoms in the alkyl group, an alkyloxycarbonylalkyl group in which the total number of carbon atoms in the alkyl group is 2 to 10, an aryl group, an acyl group, a sulfo group, or a cyano group.

* * * * *